United States Patent
Watanabe et al.

(10) Patent No.: US 12,530,774 B2
(45) Date of Patent: Jan. 20, 2026

(54) MEDICAL INFORMATION MANAGEMENT APPARATUS, DATA STRUCTURE OF MEDICAL INFORMATION, AND STORAGE MEDIUM

(71) Applicant: Konica Minolta, Inc., Tokyo (JP)

(72) Inventors: Ryoichi Watanabe, Toyohashi (JP); Akinori Tsunomori, Kodaira (JP); Sumiya Nagatsuka, Hino (JP); Ikki Nakamura, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 369 days.

(21) Appl. No.: 17/645,853

(22) Filed: Dec. 23, 2021

(65) Prior Publication Data

US 2022/0245816 A1 Aug. 4, 2022

(30) Foreign Application Priority Data

Jan. 18, 2021 (JP) ................................ 2021-005831

(51) Int. Cl.
*G06T 7/00* (2017.01)
*G06T 7/246* (2017.01)
*G16H 50/20* (2018.01)

(52) U.S. Cl.
CPC ............ *G06T 7/0016* (2013.01); *G06T 7/248* (2017.01); *G16H 50/20* (2018.01);
(Continued)

(58) Field of Classification Search
CPC . G06T 2207/10116; G06T 2207/30004; G06T 2207/30061; G06T 2207/30012; G06T 2207/30048; G06T 2207/30104; G06T 7/246–251; G06T 7/0012–0016; G16H 50/20
See application file for complete search history.

(56) References Cited

U.S. PATENT DOCUMENTS 5,807,256 A * 9/1998 Taguchi .................... G06T 7/11
  600/300
9,764,162 B1 * 9/2017 Willcut ................ G06T 7/0014
(Continued)

FOREIGN PATENT DOCUMENTS

CN         105246407 A      1/2016
JP         2016-174735 A   10/2016
(Continued)

OTHER PUBLICATIONS

JPO, Office Action for the related Japanese Application No. 2021-005831, dated Feb. 1, 2022, with English translation.
(Continued)

*Primary Examiner* — Utpal D Shah
*Assistant Examiner* — Jack Peter Kraynak
(74) *Attorney, Agent, or Firm* — LUCAS & MERCANTI, LLP

(57) ABSTRACT

A medical information management apparatus includes a hardware processor that manages first dynamic information obtained by performing dynamic radiographing on a first subject that does not have a disease and first attribute information of the first subject. The first dynamic information and the first attribution information is associated with each other.

25 Claims, 12 Drawing Sheets

(52) U.S. Cl.
CPC ............... *G06T 2207/10116* (2013.01); *G06T 2207/20081* (2013.01); *G06T 2207/20084* (2013.01)

(56) References Cited

U.S. PATENT DOCUMENTS

| | | | |
|---|---|---|---|
| 9,924,887 B2* | 3/2018 | Kimura | A61B 5/7425 |
| 11,065,079 B2* | 7/2021 | Wolf | G06V 20/20 |
| 11,195,610 B2* | 12/2021 | Shimomura | G16H 50/30 |
| 11,484,280 B2* | 11/2022 | Kuwata | A61B 6/5205 |
| 2013/0156267 A1* | 6/2013 | Muraoka | A61B 6/5217 382/103 |
| 2013/0259350 A1* | 10/2013 | Sato | G06T 7/0014 382/131 |
| 2016/0104283 A1* | 4/2016 | Fujiwara | A61B 6/5264 382/132 |
| 2016/0350923 A1* | 12/2016 | Muraoka | G06T 7/20 |
| 2018/0342060 A1* | 11/2018 | Yao | A61B 6/5217 |
| 2020/0034964 A1* | 1/2020 | Shimamura | G06T 7/20 |
| 2020/0193595 A1* | 6/2020 | Iwamura | G16H 10/60 |
| 2020/0327665 A1* | 10/2020 | Shimamura | A61B 6/541 |
| 2021/0166378 A1* | 6/2021 | Iida | A61B 5/7275 |
| 2021/0201482 A1* | 7/2021 | Hattori | G06V 10/764 |
| 2021/0256295 A1* | 8/2021 | Matsumoto | G16H 30/40 |
| 2021/0398284 A1* | 12/2021 | Ando | A61B 6/463 |
| 2022/0285026 A1* | 9/2022 | Golay | G06F 21/6245 |

FOREIGN PATENT DOCUMENTS

| | | |
|---|---|---|
| JP | 2019-180883 A | 10/2019 |
| WO | 2012/026145 A1 | 3/2012 |

OTHER PUBLICATIONS

Office Action, dated Feb. 26, 2025, issued for the corresponding Chinese Patent Application No. 202210042193.1, 19 pages, with English translation.

Office Action ("Communication") dated Jul. 4, 2025, which was issued for the corresponding Chinese patent application No. 202210042193.1, 13 pages, with English translation.

Office Action, dated Nov. 24, 2024, which was issued for the corresponding Chinese Patent Application No. 202210042193.1, 10 pages, with English translation.

* cited by examiner

FIG.3

| DYNAMIC INFORMATION | | | | ATTRIBUTE INFORMATION | | | | | | | DIAGNOSIS RESULT | |
|---|---|---|---|---|---|---|---|---|---|---|---|---|
| DYNAMIC IMAGE | MOTION INFORMATION | | | AGE | SEX | BODY HEIGHT | BODY WEIGHT | BMI | SMOKING HISTORY | PULMONARY FUNCTION TEST RESULT | NORMAL/ ABNORMAL FLAG | DIAGNOSIS NAME |
| | SPEED OF DIAPHRAGM | CHANGE RATE OF AREA OF LUNG FIELD | RESTENOSIS RATE OF DIAMETER OF AIRWAY ... | | | | | | | ... | | |
| | | | | | | | | | | | | |
| | | | | | | | | | | | | |
| | | | | | | | | | | | | |
| | | | | | | | | | | | | |
| | | | | | | | | | | | | |

152

MEDICAL INFORMATION MANAGEMENT APPARATUS, DATA STRUCTURE OF MEDICAL INFORMATION, AND STORAGE MEDIUM

CROSS-REFERENCE TO RELATED APPLICATIONS

The entire disclosure of Japanese Patent Application No. 2021-005831 filed on Jan. 18, 2021 is incorporated herein by reference in its entirety.

BACKGROUND

Technological Field

The present invention relates to a medical information management apparatus, a data structure of medical information, and a storage medium storing a medical information management program.

Description of the Related Art

Typically, a diagnosis method for detecting an abnormality such as a lesion by comparing a current image with an image obtained by radiographing a patient in the past is used. However, an image of a normal case (hereinafter, referred to as a normal image) in the past for a diagnosis target patient does not always exist, and thus, a technique of extracting an image having a normal structure similar to a normal structure of the diagnosis target patient from a large-scale database constituted with normal images and using a similarity difference image which indicates a difference between the extracted normal image and an image of the diagnosis target patient (hereinafter, referred to as a diagnosis target image) as a diagnosis assistance image has been proposed (see JP 2016-174735A). However, a shape of an organ varies between individuals, which causes artifact in the similarity difference image, and thus, the similarity difference image is generated in a case where a shape of an organ in the normal image within the image database matches a shape of an organ in the diagnosis target image.

By the way, the above-described related art relates to a radiographic still image, and use of an image obtained by radiographing at a maximal expiratory level is known as an example of a normal image of a still image. Meanwhile, while a diagnosis using a dynamic image (dynamic information) obtained through dynamic radiographing is tried in recent years, what kind of dynamic image is a normal image is not sufficiently comprehended, and thus, a dynamic image is also determined on the basis of knowledge about a normal image of a still image.

SUMMARY

However, there is a case where a large difference cannot be found in a shape of a structure such as an organ and a bone in an image at a maximal expiratory level between a normal image and an image of a patient having a disease, and there is a problem that a doctor cannot sufficiently make a diagnosis using a dynamic image only with knowledge about a normal image of a still image.

Further, an information amount of a dynamic image is significantly larger than an information amount of a still image, and thus, importance of a normal image which becomes a diagnosis criterion increases.

Further, a dynamic image, which is a moving image, requires more time for viewing than a still image. Viewing of all frames of a moving image leads to rapid increase in man-hours of a doctor, which is unacceptable. It is therefore necessary to achieve viewing efficiency and diagnostic efficiency of a doctor in a dynamic state compared to a still image. This requires diagnosis support such as analysis of moving image data, marking of candidates for abnormal parts and informing by highlighting, or the like. Extraction, or the like, of candidates for abnormal parts for the purpose of such diagnosis support requires a normal image, and thus, collection of normal images becomes more important in a moving image than in a still image.

Further, if it is erroneously determined that there is an abnormality although a diagnosis target image does not include a disease, re-radiographing of a patient continues, which considerably increases radiation exposure compared to re-radiographing of a still image. A diagnosis using a normal image is effective also to prevent such useless radiation.

The present invention has been made in view of the problems in related art described above, and objects of the present invention are to enable dynamic information obtained by performing dynamic radiographing on a subject who does not have a disease to be utilized later.

To achieve at least one of the abovementioned objects, according to an aspect of the present invention, there is provided a medical information management apparatus including a hardware processor that manages first dynamic information obtained by performing dynamic radiographing on a first subject that does not have a disease and first attribute information of the first subject, the first dynamic information and the first attribution information being associated with each other.

To achieve at least one of the abovementioned objects, according to another aspect of the present invention, there is provided a data structure of medical information to be used by a dynamic information processing apparatus that processes dynamic information obtained by performing dynamic radiographing, the data structure including: dynamic information data obtained by performing dynamic radiographing on a subject that does not have a disease; and attribute information data of the subject associated with the dynamic information data.

To achieve at least one of the abovementioned objects, according to another aspect of the present invention, there is provided a non-transitory computer-readable storage medium storing a medical information management program causing a computer to perform a management process of managing first dynamic information obtained by performing dynamic radiographing on a first subject that does not have a disease and first attribute information of the first subject, the first dynamic information and the first attribution information being associated with each other.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 3 is a view illustrating an example of a data configuration of a case database;

DETAILED DESCRIPTION OF THE EMBODIMENTS

Hereinafter, embodiments of a medical information management apparatus, a data structure of medical information, and a medical information management program according to the present invention will be described with reference to the drawings. However, the scope of the present invention is not limited to the illustrated examples.

First Embodiment (Configuration of Medical Information Management System)

Figure 1:
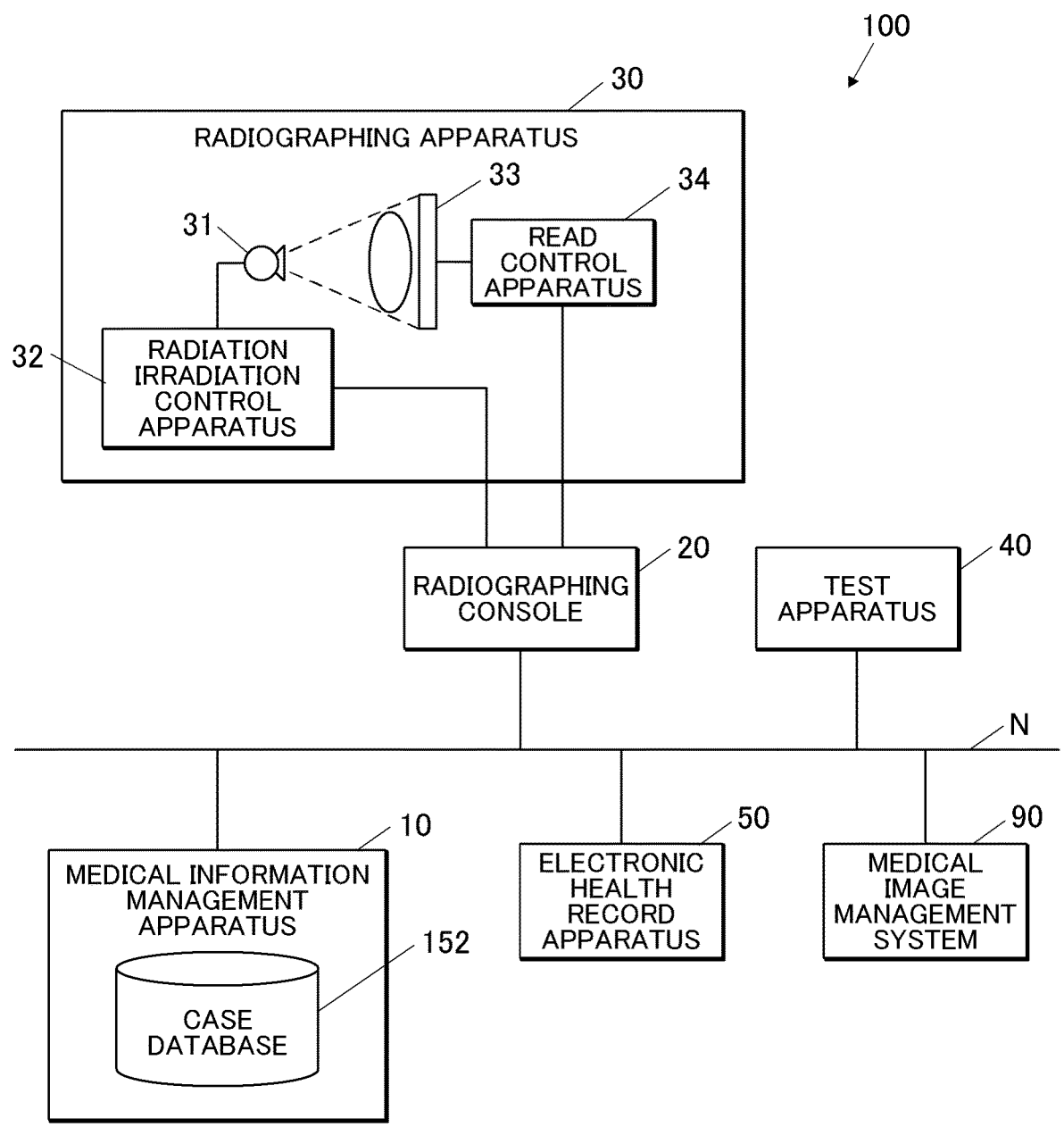
FIG. 1 is a view illustrating an entire configuration of a medical information management system according to a first embodiment of the present invention.

FIG. 1 illustrates an entire configuration of a medical information management system 100 in a first embodiment of the present invention.

As illustrated in FIG. 1, the medical information management system 100 includes a medical information management apparatus 10, a radiographing console 20, a radiographing apparatus 30, a test apparatus 40, an electronic health record apparatus 50, and a medical image management system 90. The medical information management apparatus 10, the radiographing console 20, the test apparatus 40, the electronic health record apparatus 50, and the medical image management system 90 are connected via a communication network N such as a local area network (LAN).

The medical information management apparatus 10 includes a case database 152 and manages dynamic information such as a dynamic image obtained by radiographing by the radiographing apparatus 30 and attribute information of a subject who is a radiographing target in association with each other.

The radiographing console 20 outputs a radiation irradiation condition and an image read condition to the radiographing apparatus 30 to control radiographing by the radiographing apparatus 30 and read operation of a radiograph.

The radiographing apparatus 30 is an apparatus which can radiograph a dynamic state such as shape change including expansion and contraction of a lung associated with respiratory movement and heartbeats. In dynamic radiographing, a plurality of images indicating a dynamic state of a subject are acquired by repeatedly irradiating the subject with pulsed radiation such as an X ray at predetermined time intervals (pulse radiation) or continuously irradiating the subject at a low dose in a seamless manner (continuous radiation). A series of images obtained through dynamic radiographing will be referred to as a dynamic image. Further, each of a plurality of images which constitute a dynamic image will be referred to as a frame image. A case will be described below using an example where dynamic radiographing is performed through pulse radiation.

Dynamic radiographing includes radiographing of a moving image, but does not include radiographing of a still image while displaying a moving image. Further, a dynamic image includes a moving image, but does not include an image obtained through radiographing of a still image while displaying a moving image.

The radiographing apparatus 30 includes a radiation source 31, a radiation irradiation control apparatus 32, a radiation detector 33 and a read control apparatus 34.

The radiation source 31 is disposed at a position facing the radiation detector 33 across the subject and irradiates the subject with radiation in accordance with control of the radiation irradiation control apparatus 32.

The radiation irradiation control apparatus 32 is connected to the radiographing console 20 and controls the radiation source 31 on the basis of the radiation irradiation condition input from the radiographing console 20 to perform radiographing. The radiation irradiation condition includes, for example, a pulse rate, a pulse width, a pulse interval, the number of radiographing frames per one radiographing, a tube current, a tube voltage, a type of an added filter, and the like. The pulse rate is the number of times of radiation irradiation per one second. The pulse width is a radiation irradiation period per one radiation irradiation. The pulse interval is a period from when one radiation irradiation is started until the next radiation irradiation is started.

The radiation detector 33 is constituted with a semiconductor image sensor such as a flat panel detector (FPD). The FPD includes a glass substrate, or the like, and a plurality of detection elements (pixels) which detect at least radiation which is radiated from the radiation source 31 and penetrates the subject, in accordance with intensity of the radiation, convert the detected radiation into electrical signals and accumulate the electrical signals are arranged in a matrix at predetermined positions on the substrate. Each pixel includes a switch such as a thin film transistor (TFT).

The read control apparatus 34, which is connected to the radiographing console 20, controls the switches of the respective pixels of the radiation detector 33 on the basis of an image read condition input from the radiographing console 20 to switch read of the electrical signals accumulated at the respective pixels and acquires image data by reading electrical signals accumulated at the radiation detector 33. This image data is each frame image of a dynamic image. The read control apparatus 34 outputs the acquired dynamic image to the radiographing console 20. The image read condition includes, for example, a frame rate, a frame interval, a pixel size, an image size (matrix size), and the like. The frame rate is the number of frame images acquired per one second and matches the pulse rate. The frame interval, which is a period from when operation of acquiring one frame image is started until when operation of acquiring the next frame image is started, matches the pulse interval.

The test apparatus 40 is an apparatus that performs a pulmonary function test (PFT) on a patient. In the pulmonary function test, vital capacity (VC), total lung capacity (TLC), functional residual capacity (FRC), a residual volume (RV), RV/TLC, an expiratory reserve volume (ERV), a forced expiratory volume in one second (FEV1), or the like, are measured.

The electronic health record apparatus 50 manages health record information on each patient. The health record information includes patient information regarding a patient.

The medical image management system 90 manages image information on each patient. The medical image management system 90 includes image information regarding a patient.

(Configuration of Medical Information Management Apparatus)

Figure 2:
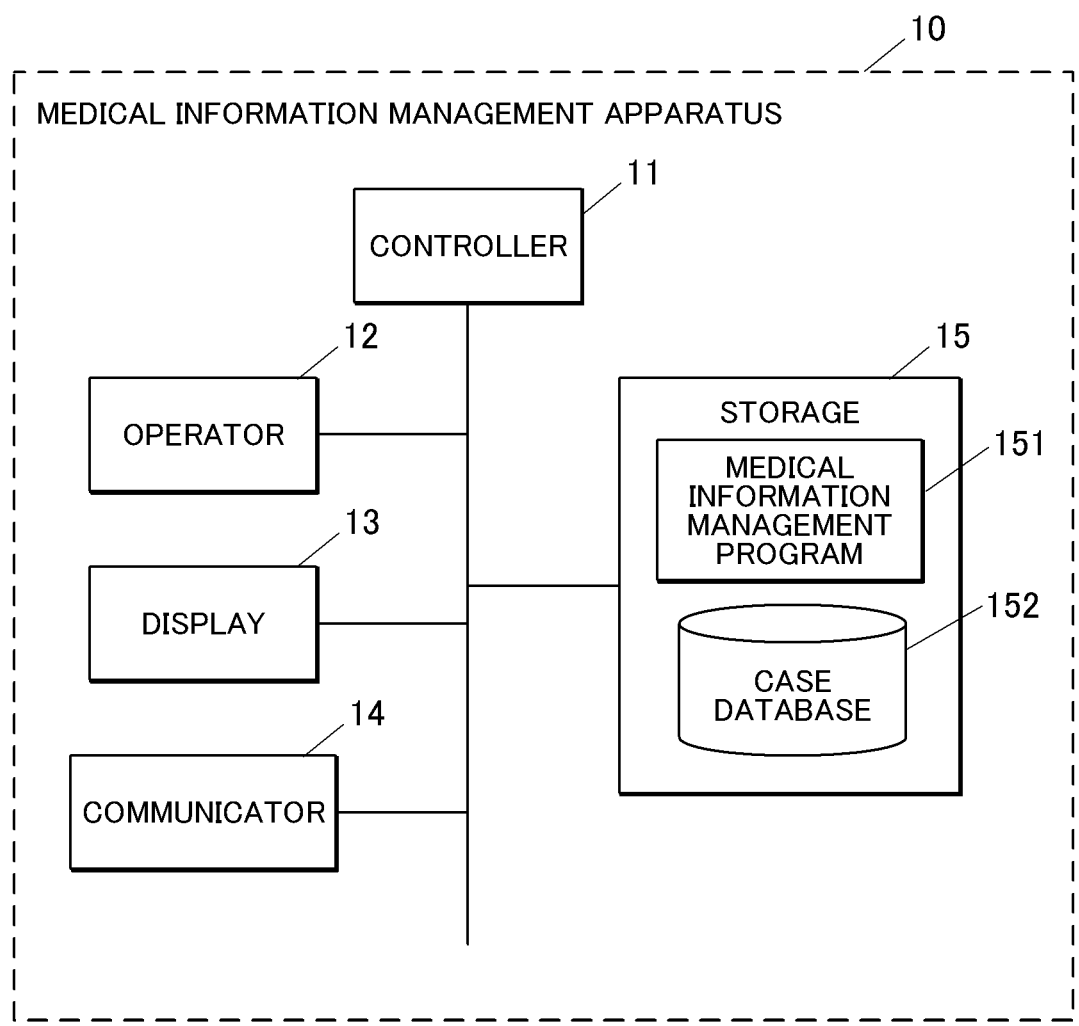
FIG. 2 is a block diagram illustrating a functional configuration of a medical information management apparatus.

FIG. 2 illustrates a functional configuration of the medical information management apparatus 10. As illustrated in FIG. 2, the medical information management apparatus 10 includes a controller 11, an operator 12, a display 13, a communicator 14 and a storage 15, which are connected with a bus.

The controller 11 includes a central processing unit (CPU), a random access memory (RAM), or the like. The CPU of the controller 11 reads out a system program and various kinds of processing programs stored in the storage 15, loads the programs to the RAM and executes various kinds of processing in accordance with the loaded programs.

The operator 12, which includes a keyboard including cursor keys, character and number entry keys, various kinds of function keys, and the like, and a pointing device such as a mouse, outputs an instruction signal input through key operation and mouse operation on the keyboard to the controller 11. Further, the operator 12 may include a touch panel on a display screen of the display 13, in which case the operator 12 outputs an instruction signal input via the touch panel to the controller 11.

The display 13, which includes a monitor such as a liquid crystal display (LCD), displays various kinds of screens in accordance with an instruction of a display signal input from the controller 11.

The communicator 14, which includes a LAN adapter, a modem, a terminal adapter (TA), or the like, controls data transmission/reception with each apparatus connected to the communication network N.

The storage 15 includes a non-volatile semiconductor memory, a hard disk, or the like. The storage 15 stores data such as various kinds of programs including the medical information management program 151 to be executed at the controller 11, parameters required for executing processing by the programs and processing results. Further, the storage 15 stores the case database 152.

FIG. 3 illustrates an example of a data configuration of the case database 152.

As illustrated in FIG. 3, dynamic information, attribute information and diagnosis results are stored in the case database 152 in association with one another. In the case database 152, data corresponding to one row is dealt with as one piece of case data.

The dynamic information, which is information obtained by performing dynamic radiographing on the subject, includes at least one of a dynamic image or motion information.

The dynamic image is a series of images (image data) obtained through dynamic radiographing. In the case database 152, path name indicating a location where a file of the dynamic image is stored may be associated in place of the dynamic image.

The motion information is information representing motion of parts (for example, parts relating to a respiratory organ, a circulatory organ, orthopedics and swallowing) of the subject obtained from the dynamic image. The motion information includes a position obtained for each frame image, speed obtained from a difference between frame images, and information such as maximum speed and a change rate of a size which can be analytically obtained from these kinds of information. As the motion information, for example, information obtained by quantifying motion of parts such as speed of a diaphragm, a change rate of an area of a lung field and a restenosis rate of a diameter of an airway is used. Further, in a case where the motion information is time-series data, the information may be graphically indicated over time.

In a case where a posterior costal bone, a breast bone, a collar bone, a spine, a diaphragm and a rib cage are made radiographing target portions, as the motion information, time-series change of positions, time-series change of speed, maximum distances from initial positions, maximum/minimum speed, or the like, are used.

In a case where a heart is made a radiographing target portion, as the motion information, time-series change of a size, time-series change of concentration of signal values, a size change rate, a change rate of concentration of signal values, or the like, are used.

In a case where an aortic arch is made a radiographing target portion, as the motion information, time-series change of concentration of signal values, a change rate of concentration of signal values, or the like, are used.

In a case where a trachea is made a radiographing target portion, as the motion information, time-series change of a size of tracheal dimension, a degree of narrowing of the tracheal dimension, or the like, are used.

In a case where a lung field is made a radiographing target portion, as the motion information, time-series change of a size of the lung field, a change rate of an area of a maximum/minimum lung field, a change rate of concentration of signal values, or the like, are used.

The attribute information is information indicating attributes of the subject who is made a radiographing target of a dynamic image. Examples of the attribute information can include, for example, age, sex, body height, body weight, BMI, race and smoking history. The attribute information does not include information which specifies an individual. Examples of the information which specifies an individual can include name, address and phone number.

Further, test results such as results of a pulmonary function test may be used as the attribute information. The results of the pulmonary function test include vital capacity (VC), total lung capacity (TLC), functional residual capacity (FRC), a residual volume (RV), RV/TLC, an expiratory reserve volume (ERV), a forced expiratory volume in one second (FEV1), or the like.

Further, radiographing conditions (such as the radiation irradiation condition and the image read condition) upon radiographing of a dynamic image at the radiographing apparatus 30 may be used as the attribute information. The radiographing conditions may include date and time of radiographing, a portion, a radiographing direction, or the like.

The diagnosis results, which are diagnosis results for dynamic information (the subject who is made a radiographing target of the dynamic image), include a normal/abnormal flag and diagnosis name.

The normal/abnormal flag is a flag indicating whether or not the subject has a disease, and in a case where the subject does not have a disease, the flag indicates "normal", while in a case where the subject has a disease, the flag indicates "abnormal".

The diagnosis name is diagnosis name (such as name of a disease) in a case where the normal/abnormal flag is "abnormal", that is, in a case where the subject has a disease. In a case where the normal/abnormal flag is "normal", the diagnosis name is "no disease". Note that in a case where the normal/abnormal flag is "normal", the diagnosis name may be made blank.

A disease includes, for example, diseases relating to a respiratory organ, a circulatory organ, orthopedics and swallowing. More specifically, a disease relating to a respiratory organ includes a chronic obstructive pulmonary disease (COPD) and pneumonia, a disease relating to a circulatory organ includes a heart failure and pulmonary embolism, and a disease relating to orthopedics includes arthropathy and fracture.

Further, as the normal/abnormal flag, a normal/abnormal flag for a particular disease such as, for example, a normal/abnormal flag for a disease relating to a respiratory organ and a normal/abnormal flag for a circulatory organ may be added as well as a normal/abnormal flag for all diseases.

In the case database 152, a record for which the normal/abnormal flag is "normal" is a normal case, and a record for which the normal/abnormal flag is "abnormal" is an abnormal case.

The case database 152 has a data structure of medical information which is to be used at the medial information management apparatus 10 as a dynamic information processing apparatus that processes dynamic information obtained through dynamic radiographing. Here, the dynamic information to be processed is a dynamic image or motion information of the diagnosis target patient. The processing to be performed on the dynamic information includes display processing (such as simultaneous display with normal case data), statistical analysis, inference (machine learning, deep learning) as well as image processing on the dynamic image of the diagnosis target patient.

Statistical analysis, which is processing of performing statistical analysis on data to be processed, includes processing of calculating an average value, a median value, standard deviation, or the like, processing of analyzing distribution of data by creating histogram, or the like.

Inference is processing of deriving inference results from the data to be processed on the basis of results obtained through machine learning. Use of case data managed in the case database 152 in machine learning will be described in a second embodiment and the subsequent embodiments.

A user can utilize the case data managed in the case database 152 by accessing the case database 152. For example, in a case where it is desired to analyze motion information of a diaphragm (such as a position and speed of the diaphragm) while specifying age and sex, the user extracts case data from the case database 152 while specifying an age range and sex as search conditions. Then, the user calculates the number of pieces of data (the number of extracted cases), average age (an average value of age of the extracted case data), an average amplitude (an average value of amplitudes of the diaphragm in the extracted case data), average speed (an average value of speed of the diaphragm in the extracted case data), displays analysis results, stores the analysis results in a recording medium, or transmits the analysis results to an external apparatus.

The controller 11 manages dynamic information (hereinafter, referred to as "normal dynamic information") obtained by performing dynamic radiographing on a subject who does not have a disease (for example, in a case where the dynamic information is obtained through dynamic radiographing of parts relating to a respiratory organ, the subject may have a disease (for example, fracture) other than the disease of the respiratory organ (such as, for example, an arm which relates to orthopedics)) and attribute information of the subject who does not have a disease (hereinafter, referred to as "normal attribute information") in association with each other. In other words, the controller 11 functions as a manager (hardware processor).

The normal dynamic information includes both a case where radiographing is performed while it is understood in advance that the subject does not have a disease and a case where it is diagnosed that the subject does not have a disease on the basis of the dynamic information after radiographing.

The controller 11 (manager) further manages third dynamic information (hereinafter, referred to as "abnormal dynamic information") obtained by performing dynamic radiographing on a third subject who has a disease and attribute information of the third subject who has a disease (hereinafter, referred to as "abnormal attribute information") in association with each other.

The abnormal dynamic information includes both a case where radiographing is performed while it is understood in advance that the subject has a disease and a case where it is diagnosed that the subject has a disease on the basis of the dynamic information after radiographing.

The controller 11 determines normality or abnormality of second dynamic information (hereinafter, referred to as "diagnosis target dynamic information") obtained by performing dynamic radiographing on a second subject (hereinafter, referred to as a "diagnosis target patient") on the basis of the normal dynamic information. In other words, the controller 11 functions as a determiner (hardware processor).

The normality, which is information indicating whether or not the diagnosis target dynamic information is normal, includes a degree of normality of the diagnosis target dynamic information.

The abnormality, which is information indicating whether or not the diagnosis target dynamic information is abnormal, includes a degree of abnormality of the diagnosis target dynamic information.

For example, the controller 11 compares the normal dynamic information with the diagnosis target dynamic information, and in a case where the diagnosis target dynamic information is similar to (not different from) the normal dynamic information, determines that the diagnosis target dynamic information is normal. Meanwhile, in a case where the diagnosis target dynamic information is largely different from the normal dynamic information, the controller 11 determines that the diagnosis target dynamic information is abnormal. Note that a predetermined threshold, or the like, can be used in determination as to whether the diagnosis target dynamic information is similar to or different from the normal dynamic information.

The controller 11 (determiner) determines normality or abnormality of the diagnosis target dynamic information on the basis of the normal dynamic information and the normal attribute information. Specifically, the controller 11 determines normality or abnormality of the diagnosis target dynamic information by comparing normal dynamic information corresponding to attribute information (normal attribute information) which is the same as or similar to attribute information of the diagnosis target patient with the diagnosis target dynamic information. A predetermined threshold, or the like, can be used to determine similarity in the attribute information.

The controller 11 (determiner) determines normality or abnormality of the diagnosis target dynamic information by performing dynamic radiographing on the diagnosis target patient on the basis of the normal dynamic information and the abnormal dynamic information.

For example, the controller 11 compares the normal dynamic information and the abnormal dynamic information with the diagnosis target dynamic information and, in a case where the diagnosis target dynamic information is more similar to the normal dynamic information than the abnormal dynamic information, the controller 11 determines that the diagnosis target dynamic information is normal. Meanwhile, in a case where the diagnosis target dynamic information is more similar to the abnormal dynamic information than the normal dynamic information, or in a case where the diagnosis target dynamic information is largely different from the normal dynamic information, the controller 11 determines that the diagnosis target dynamic information is abnormal. Note that a predetermined threshold, or the like, can be used to determine whether the diagnosis target dynamic information is similar to or different from the normal dynamic information or the abnormal dynamic information.

The controller 11 (determiner) determines normality or abnormality of the diagnosis target dynamic information on the basis of the normal dynamic information, the normal attribute information, the abnormal dynamic information and the abnormal attribute information. Specifically, the controller 11 determines normality or abnormality of the diagnosis target dynamic information by comparing normal dynamic information and abnormal dynamic information corresponding to attribute information (normal attribute information, abnormal attribute information) which is the same as or similar to the attribute information of the diagnosis target patient, with the diagnosis target dynamic information.

The controller 11 (determiner) determines normality or abnormality of the diagnosis target dynamic information through statistical analysis. Distribution (such as histogram), an average value, a median value, standard deviation, or the like, of the motion information can be utilized in statistical analysis.

The controller 11 outputs statistical data of the normal dynamic information, statistical data of the abnormal dynamic information, and diagnosis target dynamic information obtained by performing dynamic radiographing on the diagnosis target patient. In other words, the controller 11 functions as outputter.

The controller 11 (outputter) outputs the statistical data of the normal dynamic information, the statistical data of the abnormal dynamic information and the diagnosis target dynamic information on the same screen.

(Operation of Medical Information Management Apparatus)

Operation at the medical information management apparatus 10 will be described next.

Figure 4:
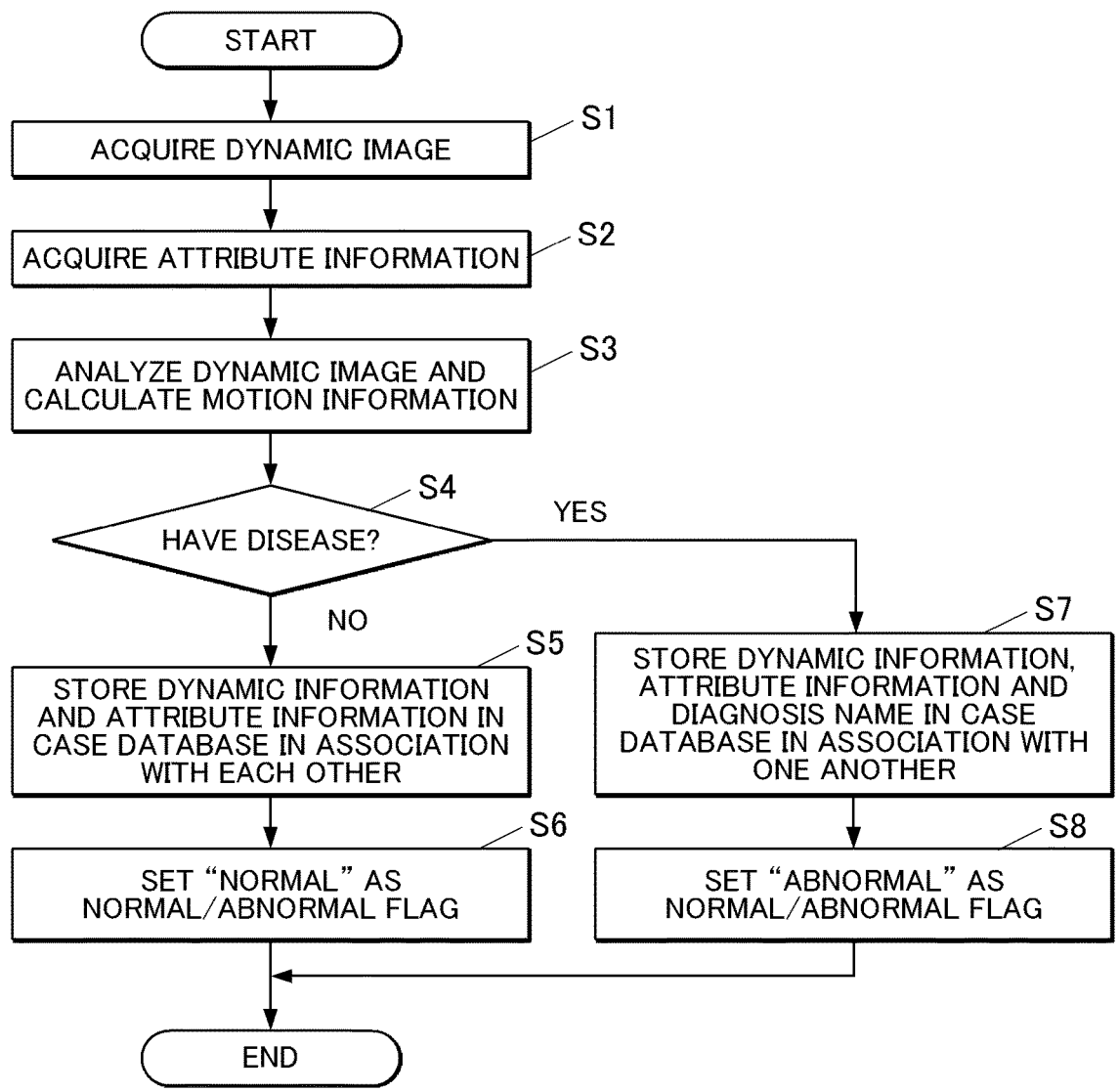
FIG. 4 is a flowchart illustrating case data registration processing.

FIG. 4 is a flowchart illustrating case data registration processing to be executed by the medical information management apparatus 10. The case data registration processing, which is processing of collecting and registering data of normal cases and abnormal cases, is implemented through software processing by coordination of the CPU of the controller 11 and the medical information management program 151 stored in the storage 15.

First, if dynamic radiographing is performed on the subject at the radiographing apparatus 30, the controller 11 of the medical information management apparatus 10 acquires a dynamic image from the radiographing console 20 via the communicator 14 (step S1). The dynamic image includes a plurality of frame images (such as, for example, 15 frames per second).

Then, the controller 11 acquires attribute information corresponding to the subject who is made a radiographing target in the dynamic image (step S2). Specifically, the controller 11 causes an input screen of the attribute information to be displayed at the display 13 and accepts input of the attribute information through operation by the user from the operator 12.

Note that the controller 11 may acquire attribute information from additional information added to a file of the dynamic image or may acquire patient information (attribute information) corresponding to the subject from the electronic health record apparatus 50 via the communicator 14. Here, in a case where the acquired information includes information which specifies an individual, such as name of the patient, the controller 11 excludes this information.

Further, the controller 11 may acquire a result of a pulmonary function test performed on the subject (patient) from the test apparatus 40 via the communicator 14 as the attribute information corresponding to the subject.

Then, the controller 11 analyzes the dynamic image acquired in step S1 and calculates motion information (step S3). The motion information includes motion information relating to a respiratory organ, a circulatory organ, orthopedics and swallowing. For example, the motion information relating to a respiratory organ includes speed of a diaphragm, a change rate of an area of a lung field, a restenosis rate of a diameter of an airway, or the like. Further, the motion information relating to a circulatory organ includes speed of motion of a cardiac wall. Further, the motion information relating to orthopedics includes trajectory (information on change of positions) of bending and stretching of a joint such as knee and elbow and stretching speed of the joint. For example, the controller 11 detects a position of the diaphragm from a dynamic image (a plurality of frame images) obtained by radiographing a front chest and calculates speed of the diaphragm between frame images. Further, the controller 11 obtains maximum speed of the diaphragm from motion of the diaphragm in a series of dynamic images.

Further, the controller 11 detects a position (region) of a lung field from the dynamic image obtained by radiographing the front chest and calculates an area of the lung field for each frame image. The controller 11 then calculates a change rate of the area of the lung field from motion of the lung field in a series of dynamic images.

Further, the controller 11 detects a position of an airway from a dynamic image obtained by radiographing the front chest and calculates a diameter of the airway for each frame image. The controller 11 then calculates a restenosis rate of the diameter of the airway from motion of the airway in a series of dynamic images.

Then, the controller 11 determines whether or not the dynamic image acquired in step S1 includes a disease (step S4). Specifically, the controller 11 causes an input screen of diagnosis results to be displayed at the display 13 and accepts input of whether or not the dynamic image includes a disease (normal/abnormal) and diagnosis name (in a case where the dynamic image includes a disease) through operation by the user from the operator 12.

In a case where the dynamic image does not include a disease (step S4: NO), the controller 11 stores the dynamic information (the dynamic image, the motion information) and the attribute information in the case database 152 in association with each other (step S5) and sets diagnosis name corresponding to this case as "no disease". Further, the controller 11 sets the normal/abnormal flag corresponding to this case as "normal" (step S6).

In step S4, in a case where the dynamic image includes a disease (step S4: YES), the controller 11 stores the dynamic information (the dynamic image, the motion information), the attribute information and diagnosis name (diagnosis results) in the case database 152 in association with one another (step S7). Further, the controller 11 sets the normal/abnormal flag corresponding to this case as "abnormal" (step S8).

After step S6 or step S8, the case data registration processing is finished.

Note that while in the case data registration processing, the dynamic image is acquired from the radiographing console 20 at a timing at which dynamic radiographing is performed at the radiographing apparatus 30 (step S1), the acquisition timing of the dynamic image is not limited to this, and a dynamic image which is radiographed in advance and accumulated may be acquired.

Figure 5:
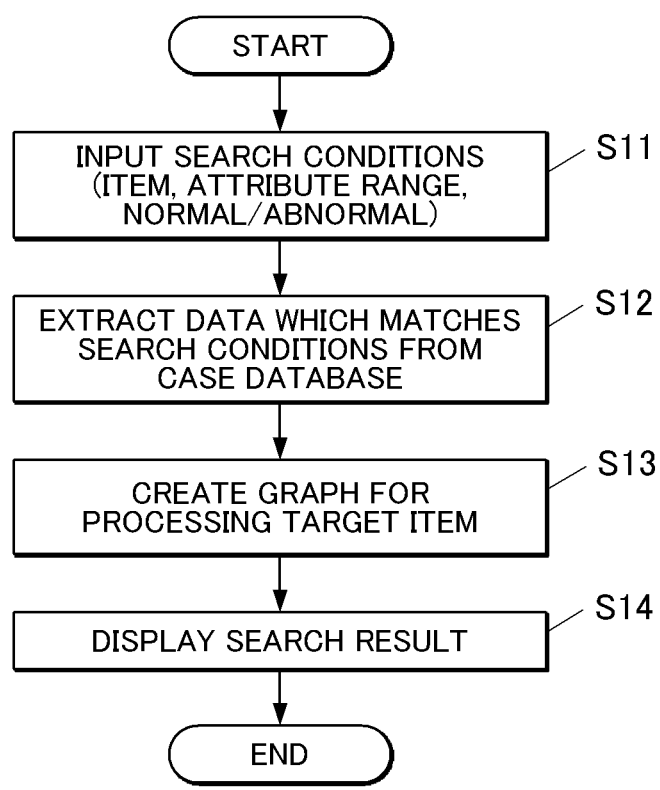
FIG. 5 is a flowchart illustrating examination mode processing.

FIG. 5 is a flowchart illustrating examination mode processing to be executed by the medical information management apparatus 10. The examination mode processing, which is processing of searching for and referring to case data accumulated in the case database 152 independently from the diagnosis target case, is implemented through software processing by coordination of the CPU of the controller 11 and the medical information management program 151 stored in the storage 15.

First, the controller 11 cause an input screen of search conditions to be displayed at the display 13 and accepts input of the search conditions through operation by the user from the operator 12 (step S11). Specifically, "item", "attribute range" and "normal/abnormal" are input as the search conditions.

"Item" is an item of motion information to be processed.

"Attribute range" is a search condition relating to attributes for narrowing down cases to be searched for.

"Normal/abnormal" is a search condition indicating whether only normal cases are to be searched for, only abnormal cases are to be searched for, or both normal cases and abnormal cases are to be searched for.

The controller 11 then extracts data which matches the search conditions from the case database 152 (step S12).

For example, in a case where only the normal cases are to be searched for, the controller 11 extracts case data for which the "normal/abnormal flag" is "normal" and the "attribute information" is included in the attribute range input in step S11 from the case database 152.

In a case where normal cases and abnormal cases are to be searched for, the controller 11 extracts case data for which the "attribute information" is included in the attribute range input in step S11 from the case database 152 regardless of the "normal/abnormal flag".

The controller 11 then creates a graph for the processing target item on the basis of the extracted case data (step S13). For example, the controller 11 creates histogram which indicates a plurality of classes obtained by segmenting numerical values of the processing target item into a plurality of classes on a horizontal axis and indicates the number of cases (frequency) on a vertical axis. In a case where normal cases and abnormal cases are to be searched for, the controller 11 creates a graph so that the normal cases are distinguished from the abnormal cases by changing color, or the like.

The controller 11 then causes search results to be displayed at the display 13 (step S14).

The examination mode processing is finished as described above.

Figure 6:
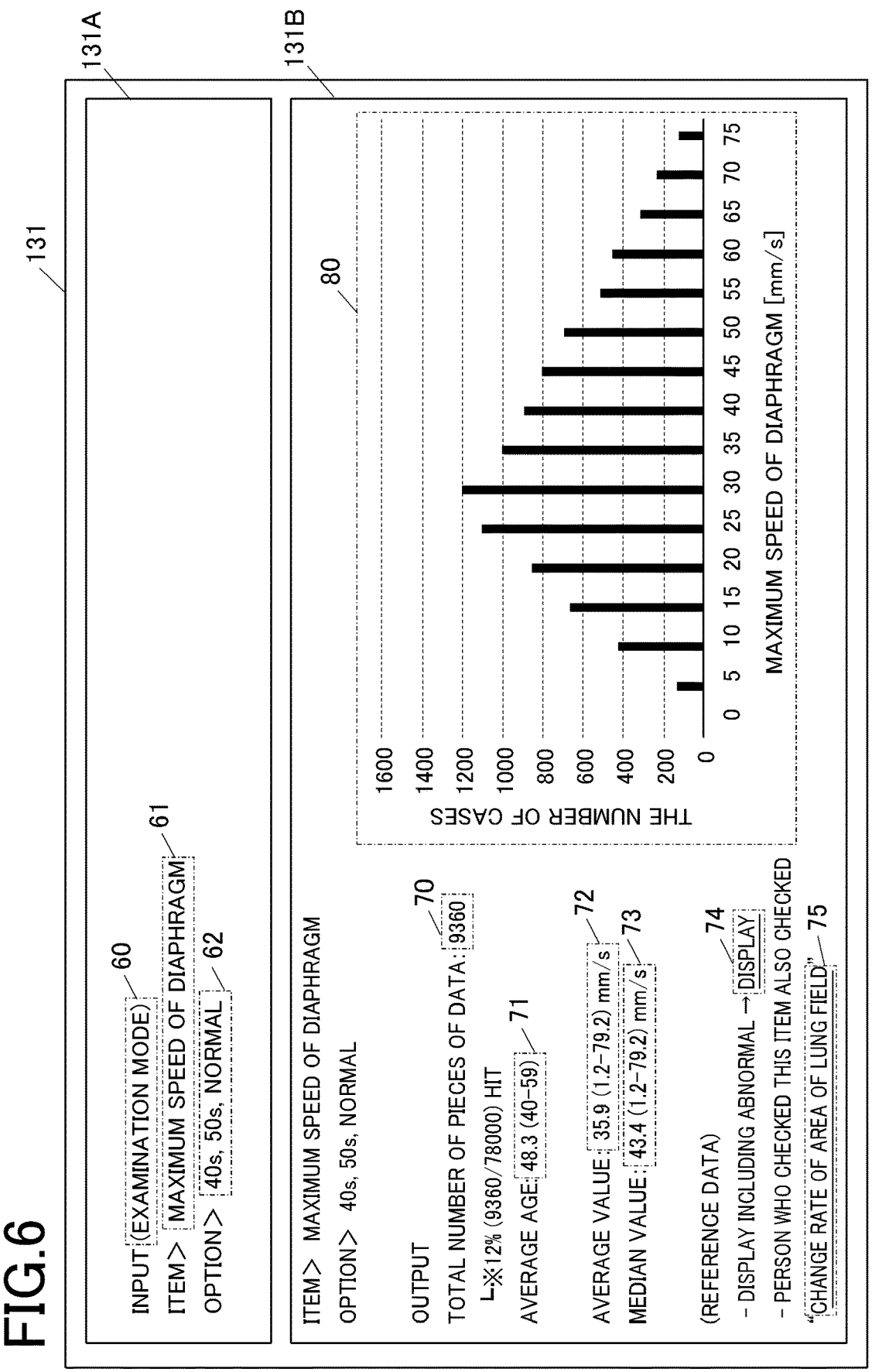
FIG. 6 is an example of a search result screen.

FIG. 6 illustrates an example of a search result screen 131 to be displayed at the display 13.

The search result screen 131 includes a search condition display region 131A and a search result display region 131B.

In the search condition display region 131A, a mode field 60, an item field 61 and an option field 62 are provided.

In the mode field 60, a mode selected by the user is displayed. In the search condition display region 131A, "examination mode" is displayed in the mode field 60.

In the item field 61, an item input by the user as the search conditions is displayed. In the search condition display region 131A, "maximum speed of diaphragm" is displayed in the item field 61.

In the option field 62, search conditions (option conditions) other than the item input by the user are displayed. In the search condition display region 131A, "40s, 50s", "normal" are displayed in the option field 62. Here, normal cases for which age is 40s or 50s are to be searched for.

The search result display region 131B includes a total data number field 70, an average age field 71, an average value field 72, a median value field 73, a graph display field 80, or the like.

In the total data number field 70, a total number of pieces of data of cases which match the search conditions is displayed.

In the average age field 71, an average age of the cases which match the search conditions is displayed. Numerical values in brackets of the average age field 71 are a minimum value and a maximum value of age in the cases which match the search conditions.

In the average value field 72 and the median value field 73, an average value and a median value of the processing target item (maximum speed of the diaphragm) in the cases which match the search conditions are respectively displayed. Numerical values in brackets of the average value field 72 and the median value field 73 are minimum values and maximum values in the processing target item (maximum speed of the diaphragm) in the cases which match the search conditions.

In the graph display field 80, histogram of the processing target item (maximum speed of the diaphragm) in the cases which match the search conditions is displayed. In the search result display region 131B, distribution of the "maximum speed of diaphragm" in normal cases for which age is 40s or 50s is displayed in the graph display field 80.

In the search result display region 131B, further, an abnormal case additional instructor 74 and an item condition change instructor 75 are provided. The abnormal case additional instructor 74 and the item condition change instructor 75 are links to related information.

If the abnormal case additional instructor 74 is depressed through operation by the user from the operator 12, search results including abnormal cases are displayed in the search result display region 131B.

If the item condition change instructor 75 is depressed through operation by the user from the operator 12, search results for which the processing target item is changed to the "change rate of area of diaphragm" are displayed in the search result display region 131B.

Figure 7:
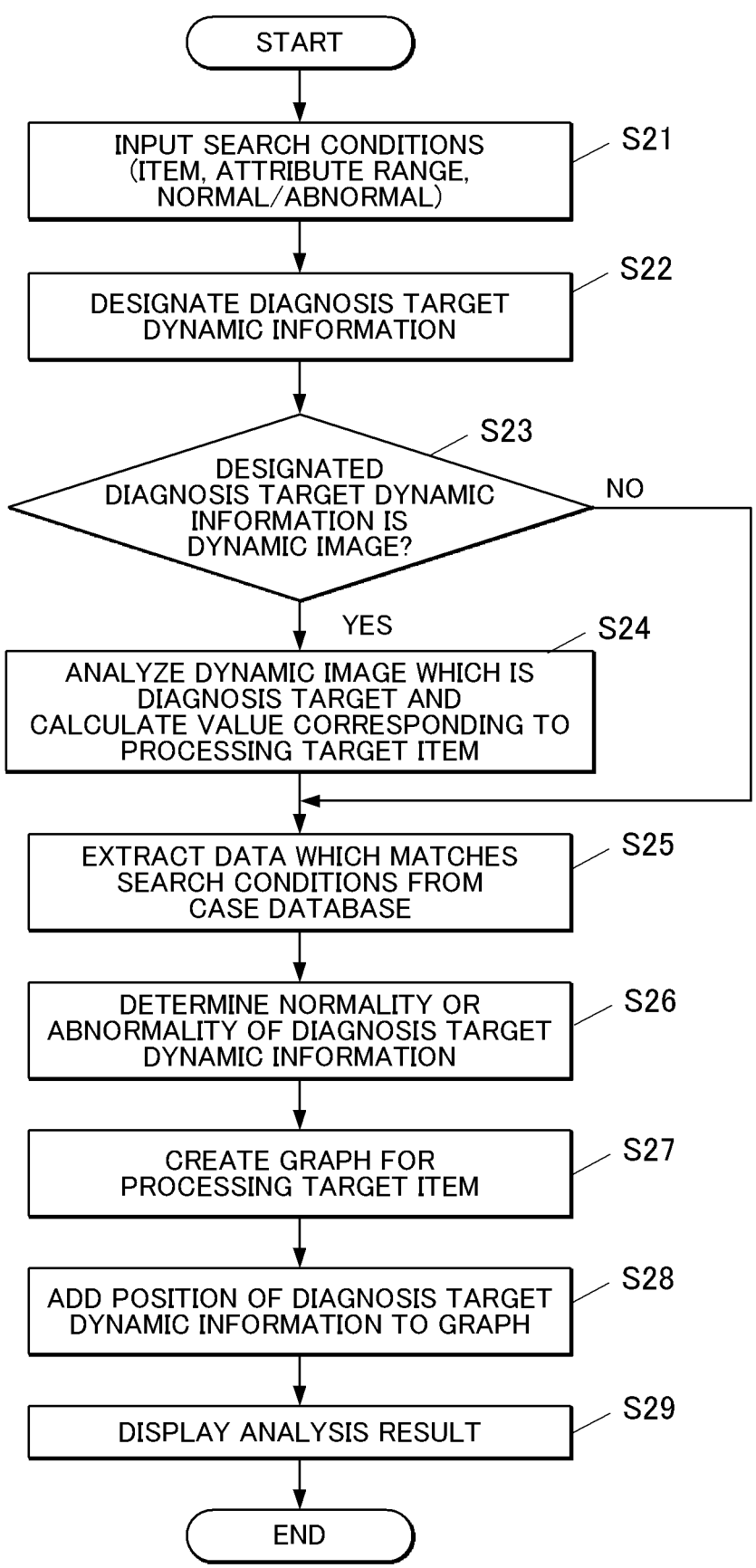
FIG. 7 is a flowchart illustrating comparison mode processing.

FIG. 7 is a flowchart illustrating comparison mode processing to be executed by the medical information management apparatus 10. The comparison mode processing, which is processing of determining normality or abnormality of the diagnosis target case by comparing the diagnosis target case with the case data accumulated in the case database 152, is implemented through software processing by coordination of the CPU of the controller 11 and the medical information management program 151 stored in the storage 15.

First, the controller 11 causes an input screen of the search conditions to be displayed at the display 13 and accepts input of the search conditions through operation by the user from the operator 12 (step S21). Specifically, "item", "attribute range" and "normal/abnormal" are input as the search conditions.

The search conditions are similar to those in step S11 in the examination mode processing (see FIG. 5).

Note that it is only necessary to designate a range including attributes of the diagnosis target case as "attribute range".

The controller 11 then causes a designation screen of the dynamic information relating to the diagnosis target case to be displayed at the display 13 and accepts designation of the diagnosis target dynamic information (the dynamic image or the motion information) through operation by the user from the operator 12 (step S22). The user may designate the dynamic image itself as the diagnosis target dynamic information or may designate the motion information (such as a numerical value) corresponding to the processing target item (item input in the search conditions). The diagnosis target dynamic information may be prepared in advance at the storage 15 of the medical information management apparatus 10 or an external apparatus, or the dynamic image radiographed at the radiographing apparatus 30 may be acquired from the radiographing console 20.

Here, the controller 11 determines whether or not the designated diagnosis target dynamic information is the dynamic image (step S23).

In a case where the designated diagnosis target dynamic information is the dynamic image (step S23: YES), the controller 11 analyzes the dynamic image which is a diagnosis target and calculates a value corresponding to the processing target item (step S24).

After step S24 or in step S23, in a case where the designated diagnosis target dynamic information is not the dynamic image (step S23: NO), that is, in a case where the motion information corresponding to the processing target item is designated as the diagnosis target dynamic information, the controller 11 extracts data which matches the search conditions from the case database 152 (step S25).

For example, in a case where only normal cases are to be searched for, the controller 11 extracts case data for which "normal/abnormal flag" is "normal" and "attribute information" is included in the attribute range input in step S21 from the case database 152.

In a case where normal cases and abnormal cases are to be searched for, the controller 11 extracts case data for which "attribute information" is included in the attribute range input in step S21 from the case database 152 regardless of "normal/abnormal flag".

The controller 11 then determines normality or abnormality of the diagnosis target dynamic information (step S26).

For example, in a case where only normal cases are to be searched for, the controller 11 determines normality or abnormality of the diagnosis target dynamic information on the basis of normal case data extracted from the case database 152.

In a case where normal cases and abnormal cases are to be searched for, the controller 11 determines normality or abnormality of the diagnosis target dynamic information on the basis of normal case data and abnormal case data extracted from the case database 152.

Determination of normality or abnormality of the diagnosis target dynamic information may be determination of normal (not including a disease) or abnormal (including a disease) or may be determination of a degree (such as a probability and a possibility) of normality and a degree (such as a probability and a possibility) of abnormality. Further, information from which a position of the diagnosis target dynamic information in distribution of normal cases and/or abnormal cases can be recognized may be generated as well as the degree of normality or abnormality being obtained as a numerical value or a level. Further, the controller 11 may specify diagnosis name in a case where it is determined as abnormal (including a disease).

The controller 11 then creates a graph for the processing target item on the basis of the extracted case data (step S27). For example, the controller 11 creates histogram which indicates a plurality of classes obtained by segmenting numerical values of the processing target item on a horizontal axis and indicates the number of cases (frequency) on a vertical axis. In a case where normal cases and abnormal cases are to be searched for, the controller 11 creates a graph so that the normal cases are distinguished from the abnormal cases by changing color, or the like.

The controller 11 then adds a position of the diagnosis target dynamic information on the graph (step S28). For example, the controller 11 adds a mark, or the like, to a position from which a class to which the diagnosis target dynamic information belongs on the graph can be recognized.

The controller 11 then causes analysis results to be displayed at the display 13 (step S29). For example, the controller 11 causes statistical data of the normal dynamic information (in a case where normal cases are to be searched for), statistical data of the abnormal dynamic information (in a case where abnormal cases are to be searched for) and the diagnosis target dynamic information to be displayed on the same screen of the display 13.

The comparison mode processing is finished as described above.

Figure 8:
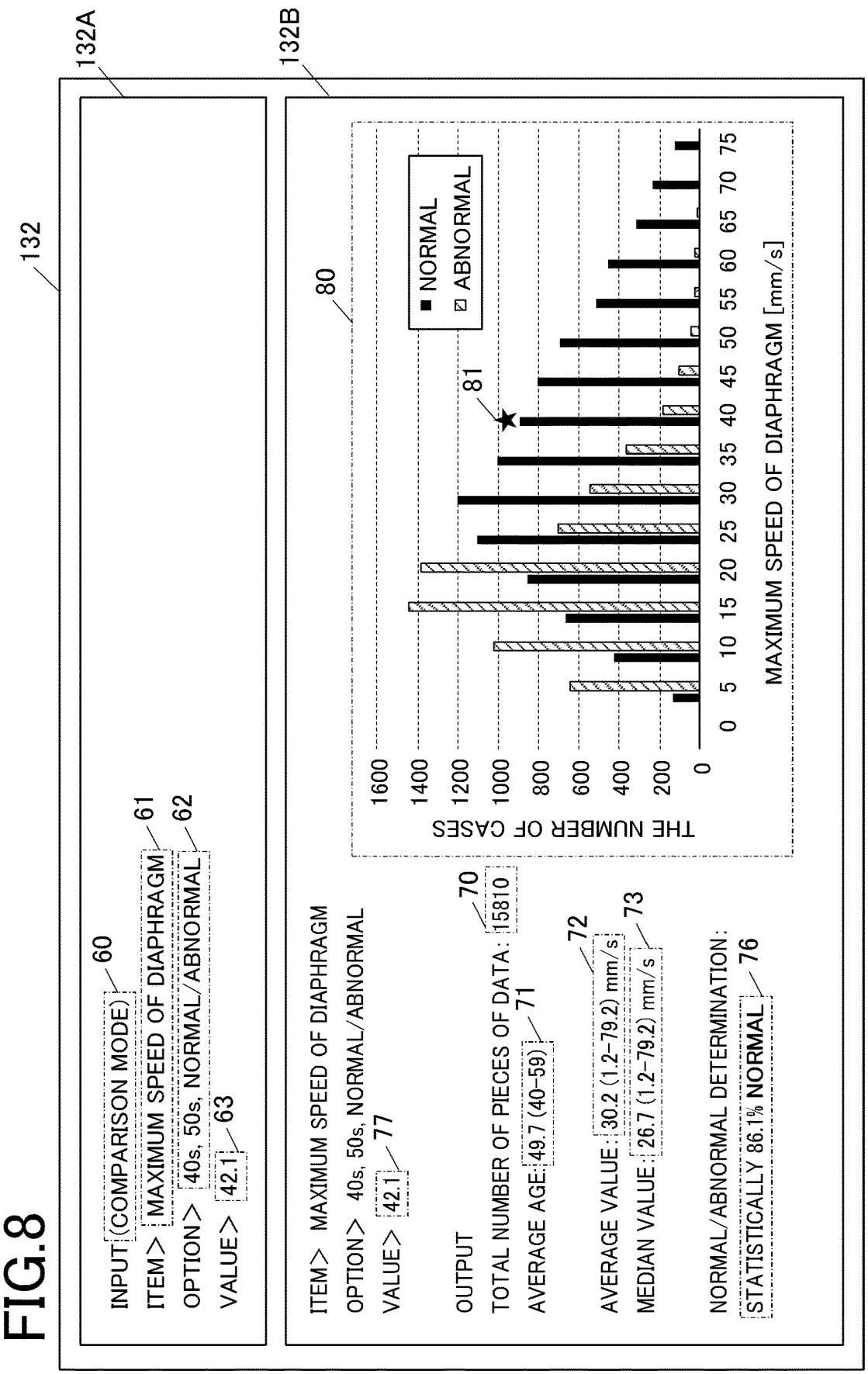
FIG. 8 is an example of an analysis result screen.

FIG. 8 illustrates an example of an analysis result screen 132 to be displayed at the display 13. The analysis result screen 132 is an example in a case where the motion information (value of maximum speed of the diaphragm) is designated as the diagnosis target dynamic information.

The analysis result screen 132 includes a search condition display region 132A and an analysis result display region 132B.

In the search condition display region 132A, a mode field 60, an item field 61, an option field 62 and a diagnosis target value field 63 are provided.

The mode field 60, the item field 61 and the option field 62 are similar to those on the search result screen 131 (see FIG. 6).

In the search condition display region 132A, "comparison mode" is displayed in the mode field 60.

In the search condition display region 132A, "maximum speed of diaphragm" is displayed in the item field 61.

In the search condition display region 132A, "40s, 50s" and "normal/abnormal" are displayed in the option field 62.

Here, normal cases and abnormal cases for which age is 40s or 50s are to be searched for.

In the diagnosis target value field 63, motion information (value of the processing target item) designated by the user is displayed as the diagnosis target dynamic information. In the search condition display region 132A, in the diagnosis target value field 63, a value of "42.1" is displayed as the maximum speed of the diaphragm.

The analysis result display region 132B includes a total data number field 70, an average age field 71, an average value field 72, a median value field 73, a normality/abnormality determination result field 76, a diagnosis target value field 77, a graph display field 80, and the like.

The total data number field 70, the average age field 71, the average value field 72 and the median value field 73 are similar to those on the search result screen 131 (see FIG. 6).

In the normality/abnormality determination result field 76, normality or abnormality determined for the diagnosis target value (value of the processing target item designated as the diagnosis target dynamic information) is displayed. Here, in the normality/abnormality determination result field 76, a probability of "86.1%" which indicates that the dynamic information is normal is displayed as a degree of normality. For example, a ratio (%) of the number of normal cases to the total number of cases (the number of normal cases+the number of abnormal cases) included in the same class as the class to which the diagnosis target value belongs is set as a probability of normality.

In the diagnosis target value field 77, the motion information (value of the processing target item) designated by the user is displayed as the diagnosis target dynamic information in a similar manner to the diagnosis target value field 63.

In the graph display field 80, histogram of the processing target item of cases which match the search conditions is displayed. In the analysis result display region 132B, distribution of "maximum speed of diaphragm" of normal cases for which age is 40s or 50s is displayed separately from distribution of "maximum speed of diaphragm" of abnormal cases for which age is 40s or 50s in the graph display field 80.

Further, in the graph display field 80, to which class on the histogram, "42.1" designated as the diagnosis target value belongs is indicated with a star mark 81.

In the analysis result screen 132, the statistical data of the normal dynamic information, the statistical data of the abnormal dynamic information and the diagnosis target dynamic information are output on the same screen.

On the analysis result screen 132, the statistical data of the normal dynamic information corresponds to histogram of normal cases in the graph display field 80. The total number of pieces of normal case data among case data which matches the search conditions, and an average value and a median value for the processing target item calculated only from the normal case data may be output (displayed) as the statistical data of the normal dynamic information.

On the analysis result screen 132, the statistical data of the abnormal dynamic information corresponds to histogram of abnormal cases in the graph display field 80. The total number of pieces of abnormal case data among case data which matches the search conditions, and an average value and a median value for the processing target item calculated only from the abnormal case data may be output (displayed) as the statistical data of the abnormal dynamic information.

On the analysis result screen 132, the diagnosis target dynamic information corresponds to the value of "42.1" in the diagnosis target value field 77 and the star mark 81 in the graph display field 80.

Figure 9:
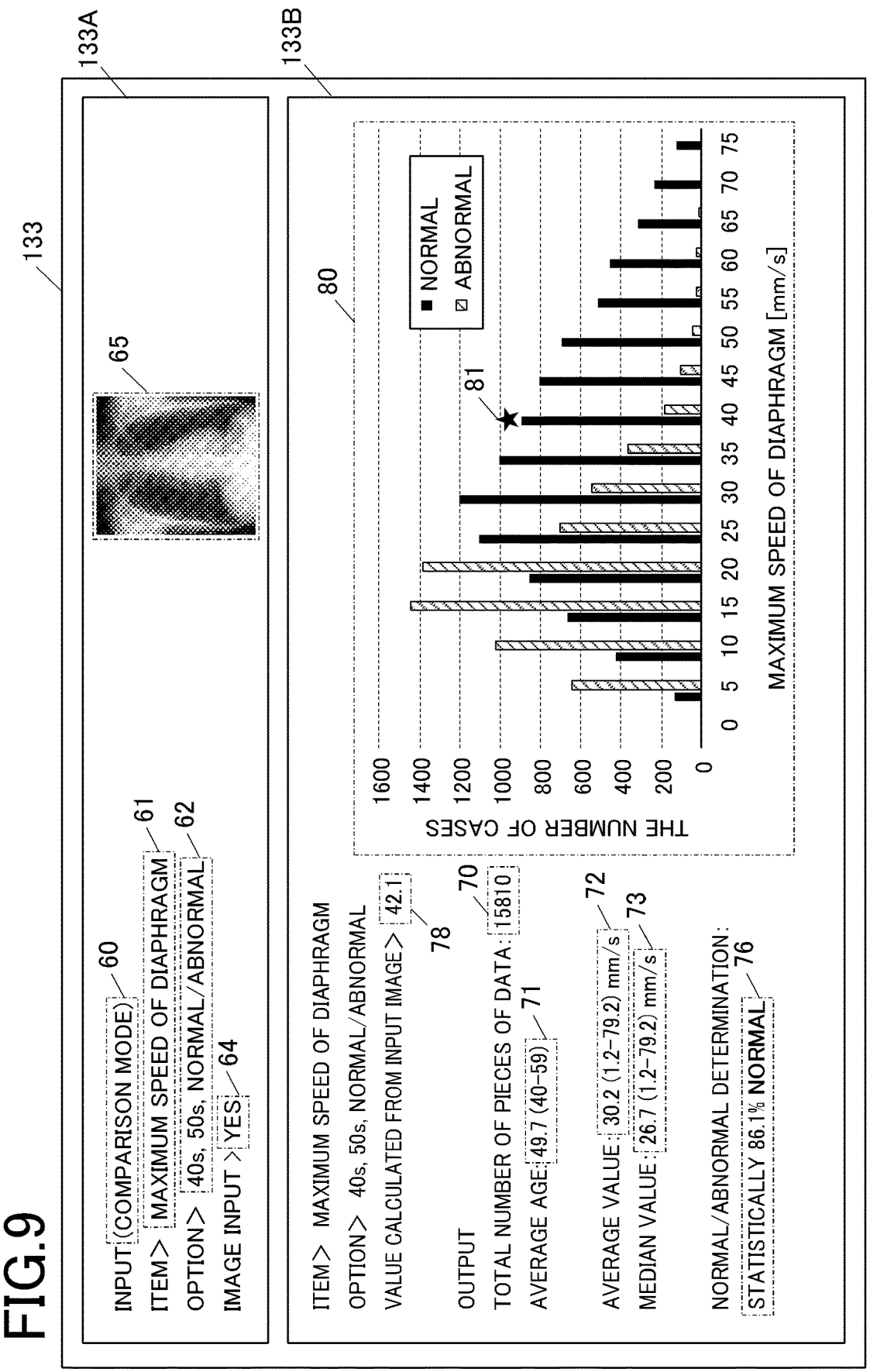
FIG. 9 is an example of an analysis result screen.

FIG. 9 illustrates an example of the analysis result screen 133 to be displayed at the display 13. The analysis result screen 133 is an example of a case where the dynamic image is designated as the diagnosis target dynamic information.

The analysis result screen 133 has substantially the same configuration as the configuration of the analysis result screen 132 (see FIG. 8), and thus, description will be omitted for the same components while the same reference numerals are assigned to components which are similar to components of the analysis result screen 132, and only portions different from the analysis result screen 132 will be described.

The analysis result screen 133 includes a search condition display region 133A and an analysis result display region 133B.

In the search condition display region 133A, a diagnosis target image input/no input field 64 and a diagnosis target image field 65 are provided in place of the diagnosis target value field 63 in the search condition display region 132A (see FIG. 8).

In the diagnosis target image input/no input field 64, whether or not the dynamic image is input as the diagnosis target dynamic information is displayed.

In a case where "input" is displayed in the diagnosis target image input/no input field 64, the dynamic image designated by the user is displayed in the diagnosis target image field 65.

In the analysis result display region 133B, a calculation value field 78 is provided in place of the diagnosis target value field 77 in the analysis result display region 132B (see FIG. 8).

In the calculation value field 78, a value of "42.1" of the processing target item calculated from the input image is displayed. Comparative search can be performed by an image being input even in a case where a value of the processing target item is not calculated for the diagnosis target.

In the normality/abnormality determination result field 76, normality or abnormality determined for the value of the processing target item calculated from the input image is displayed.

Further, in the graph display field 80, to which class on the histogram, the value of the processing target item calculated from the input image belongs is indicated with the star mark 81.

Also on the analysis result screen 133, the statistical data of the normal dynamic information (histogram of normal cases in the graph display field 80), the statistical data of the abnormal dynamic information (histogram of abnormal cases in the graph display field 80) and the diagnosis target dynamic information (the value in the calculation value field 78, the star mark 81 within the graph display field 80, the dynamic image in the diagnosis target image field 65) are output on the same screen.

As describe above, according to the first embodiment, by managing the dynamic information (normal dynamic information) obtained by performing dynamic radiographing on a subject who does not have a disease and attribute information (normal attribute information) of the subject who does not have a disease in association with each other at the medical information management apparatus 10, the dynamic information obtained by performing dynamic radiographing on the subject who does not have a disease can be utilized later. This can contribute to high-accuracy diagnosis support and clinical practice. Further, this can also help education of health personnel and studies.

Further, the attribute information (the normal attribute information, the abnormal attribute information) does not include information which specifies an individual, so that it is possible to prevent leakage of personal information of the subject (patient) who is a target of dynamic radiographing.

Further, the normal dynamic information is accumulated, so that it is possible to determine normality or abnormality of second dynamic information (diagnosis target dynamic information) obtained by performing dynamic radiographing on a second subject (diagnosis target patient) on the basis of the normal dynamic information.

Further, the normal dynamic information and the normal attribute information are accumulated in association with each other, so that it is possible to determine normality or abnormality of the diagnosis target dynamic information on the basis of the normal dynamic information and the normal attribute information.

Further, in addition to the normal dynamic information and the normal attribute information, by managing third dynamic information (abnormal dynamic information) obtained by performing dynamic radiographing on a third subject who has a disease and attribute information (abnormal attribute information) of the third subject who has a disease in association with each other at the medical information management apparatus 10, the normal dynamic information and the abnormal dynamic information can be utilized in diagnosis, or the like, in the future.

Further, the normal dynamic information and the abnormal dynamic information are accumulated, so that it is possible to determine normality or abnormality of the diagnosis target dynamic information obtained by performing dynamic radiographing on the diagnosis target patient on the basis of the normal dynamic information and the abnormal dynamic information.

Further, the normal dynamic information and the normal attribute information, and the abnormal dynamic information and the abnormal attribute information are respectively accumulated in association with each other, so that it is possible to determine normality or abnormality of the diagnosis target dynamic information on the basis of the normal dynamic information, the normal attribute information, the abnormal dynamic information and the abnormal attribute information.

Further, by the user designating the processing target item (motion information) and the attribute, it is possible to extract only corresponding information from the case database 152 and statistically display the corresponding information.

For example, as indicated in the analysis result screen 132 in FIG. 8 and the analysis result screen 133 in FIG. 9, the statistical data of the normal dynamic information, the statistical data of the abnormal dynamic information and the diagnosis target dynamic information can be output. By displaying normal cases and abnormal cases so that the normal cases are distinguished from the abnormal cases or indicating a normal range and/or an abnormal range on a graph, it is possible to provide a difference in a dynamic state between a normal subject and an abnormal subject.

Note that in a case where attribute information is not used to determine normality or abnormality of the diagnosis target dynamic information, it is only necessary to eliminate limitation by the attribute information (input of the attribute range in step S21) and set case data of all attributes within the case database 152 as a comparison target in the comparison mode processing (see FIG. 7).

Further, the extracted statistical data can be output outside. A data format for output includes, for example, csv and pdf formats.

Second Embodiment

A second embodiment to which the present invention is applied will be described next.

A medical information management system in the second embodiment has a configuration similar to the configuration of the medical information management system 100 described in the first embodiment, and thus, illustration and description of the configuration will be omitted. Characteristic configuration and processing of the second embodiment will be described below.

The medical information management apparatus 10 determines normality or abnormality of second dynamic information (diagnosis target dynamic information) obtained by performing dynamic radiographing on a second subject (diagnosis target patient) by utilizing artificial intelligence (AI).

The controller 11 of the medical information management apparatus 10 determines normality or abnormality of the diagnosis target dynamic information on the basis of the dynamic information (normal dynamic information) obtained by performing dynamic radiographing on a subject who does not have a disease, attribute information (normal attribute information) of the subject who does not have a disease, third dynamic information (abnormal dynamic information) obtained by performing dynamic radiographing on a third subject who has a disease, and attribute information (abnormal attribute information) of the third subject who has a disease.

Specifically, the controller 11 performs machine learning for determining normality or abnormality of the dynamic information on the basis of the case data accumulated in the case database 152 (see FIG. 3) and determines normality or abnormality of the diagnosis target dynamic information on the basis of learning results. Machine learning and utilization of learning results are implemented through software processing by coordination of the CPU of the controller 11 and the medical information management program 151 stored in the storage 15.

Figure 10:
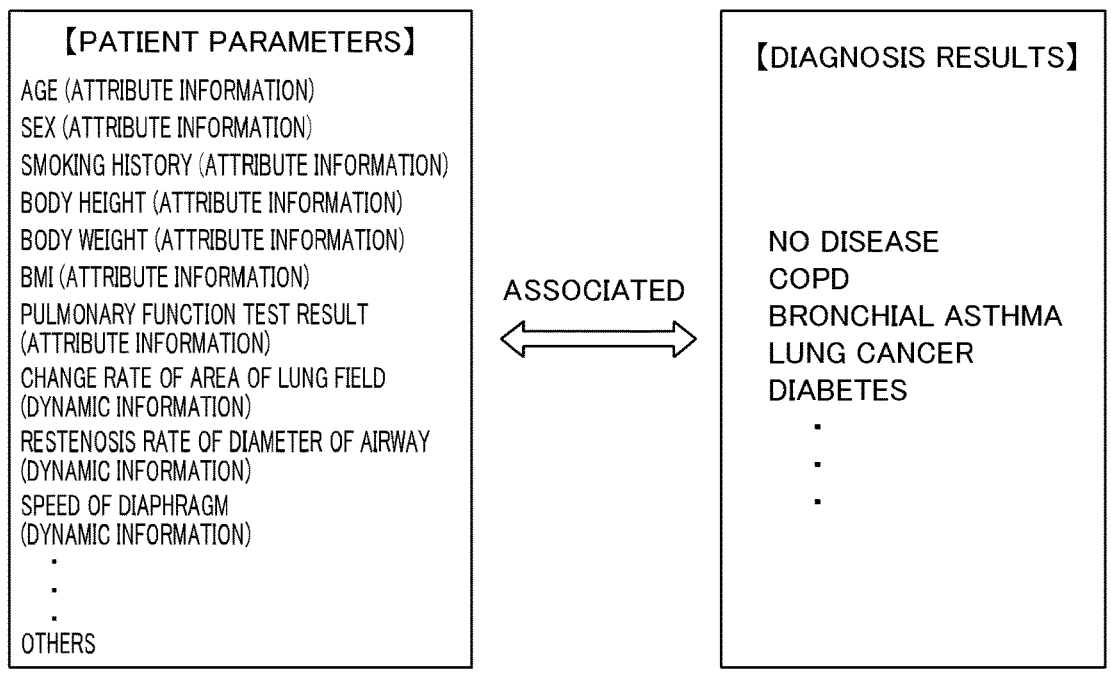
FIG. 10 is an example of machine learning data to be utilized in a second embodiment of the present invention.

At the medical information management apparatus 10, the dynamic information, the attribute information and the diagnosis results are associated with one another in the case database 152 (see FIG. 3), and thus, it can be said that patient parameters including the attribute information and the dynamic information are associated with the diagnosis results as illustrated in FIG. 10. The controller 11 generates a discriminator for determining normality or abnormality of the diagnosis target dynamic information by utilizing this correspondence relationship to perform machine learning by receiving the patient parameters as input and outputting the diagnosis results. The controller 11 determines normality or abnormality of the diagnosis target dynamic information using the discriminator which has learned.

As machine learning, support vector machine (SVM), random forest, deep learning, or the like, can be used.

Figure 11:
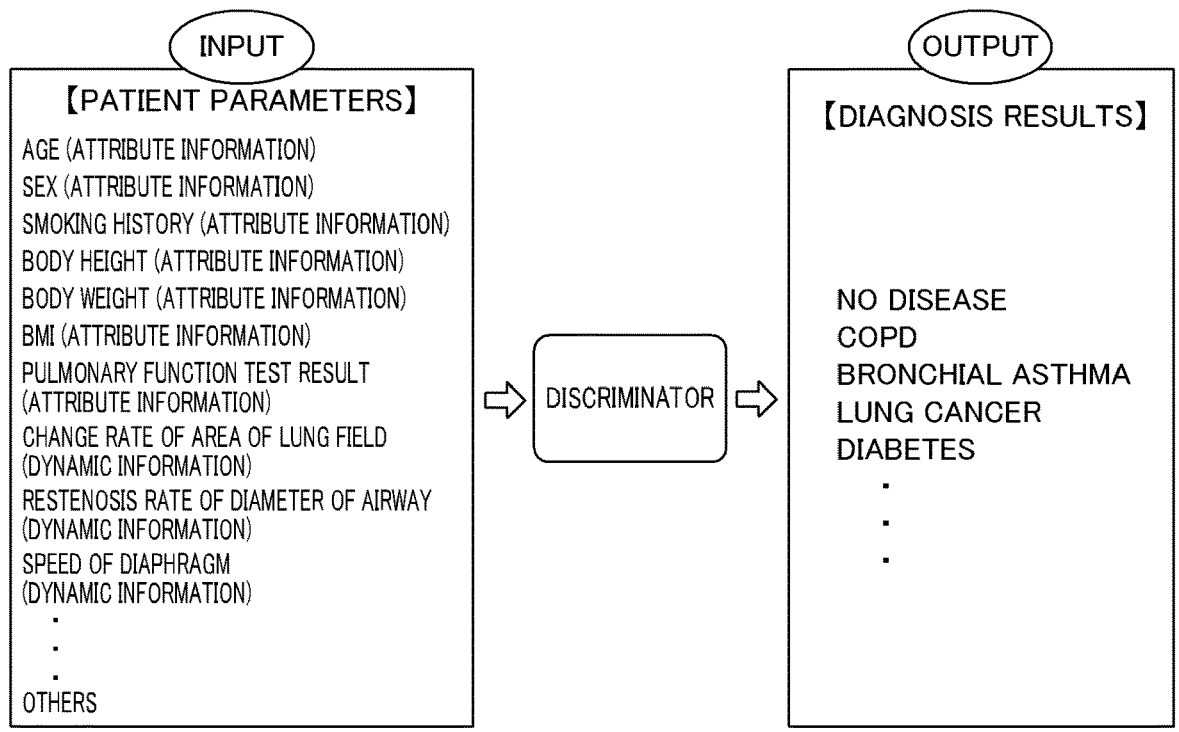
FIG. 11 is a conceptual diagram illustrating machine learning processing using patient parameters and diagnosis results.

FIG. 11 is a conceptual diagram illustrating machine learning processing using the patient parameters (input data) and the diagnosis results (correct data). The controller 11 generates a discriminator by receiving input of patient parameters such as age (attribute information), sex (attribute information), smoking history (attribute information), body height (attribute information), body weight (attribute information), BMI (attribute information), a pulmonary function test result (attribute information), a change rate of an area of a lung field (dynamic information), a restenosis rate of a diameter of an airway (dynamic information) and speed of a diaphragm (dynamic information) accumulated in the case database 152 and outputting diagnosis results such as no disease (normal), COPD, bronchial asthma, lung cancer and diabetes.

Figure 12:
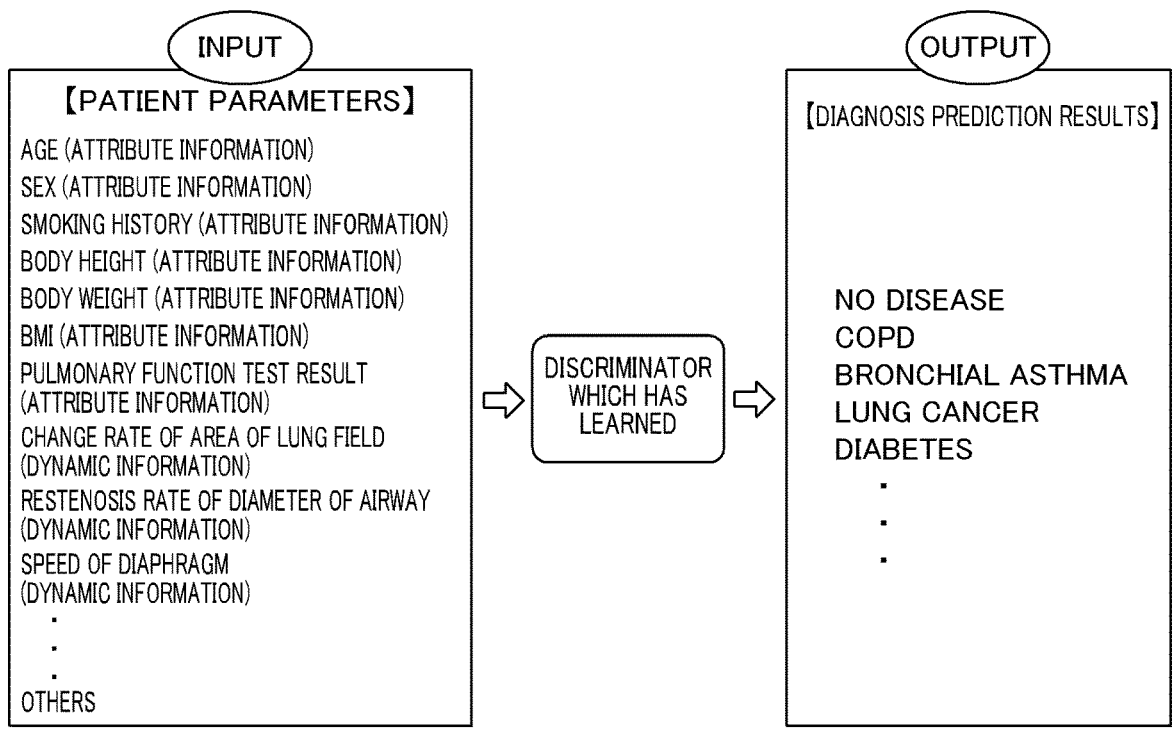
FIG. 12 is a conceptual diagram illustrating inference processing of predicting diagnosis prediction results from patient parameters using a discriminator which has learned.

FIG. 12 is a conceptual diagram illustrating inference processing of predicting diagnosis prediction results (prediction data) from the patient parameters (input data) which are diagnosis targets using the discriminator which has learned. The controller 11 inputs attribute information (such as age, sex, smoking history, body height, body weight, BMI and a pulmonary function test result) and dynamic information (such as a change rate of an area of a lung field, a restenosis rate of a diameter of an airway and speed of a diaphragm) of the diagnosis target patient to the discriminator which has learned and obtains an output result (diagnosis prediction result). The controller 11 outputs no disease (normal) or diagnosis name (such as COPD, bronchial asthma, lung cancer and diabetes) as the diagnosis prediction result. The controller 11 causes the diagnosis prediction result to be displayed at the display 13.

As described above, the second embodiment enables later use of the dynamic information (normal dynamic information) which is managed at the medical information management apparatus 10 and which is obtained by performing dynamic radiographing on a subject who does not have a disease.

Specifically, it is possible to generate a discriminator for determining normality or abnormality of the diagnosis target dynamic information by performing machine learning by utilizing correspondence relationship between the patient parameters constituted with the attribute information and the dynamic information accumulated in the case database 152 (see FIG. 3) and the diagnosis results. Use of this discriminator which has learned enables prediction of a diagnosis result of an arbitrary patient. It is therefore possible to prevent a doctor from overlooking a disease and support consideration of necessity of other tests.

Note that in the second embodiment, the attribute information does not have to be used as the patient parameters to generate a discriminator through machine learning. In this case, the controller 11 generates a discriminator by performing machine learning while receiving the dynamic information as input and outputting diagnosis results. The controller 11 determines normality or abnormality of the diagnosis target dynamic information by receiving input of the diagnosis target dynamic information using the discriminator which has learned.

Third Embodiment

A third embodiment to which the present invention is applied will be described next.

A medical information management system in the third embodiment has a configuration similar to the configuration of the medical information management system 100 described in the first embodiment, and thus, illustration and description of the configuration will be omitted. Characteristic configuration and processing of the third embodiment will be described below.

Also in the third embodiment, the medical information management apparatus 10 determines normality or abnormality of second dynamic information (diagnosis target dynamic information) obtained by performing dynamic radiographing on a second subject (diagnosis target patient) by utilizing AI.

The controller 11 of the medical information management apparatus 10 constructs a normal model through machine learning (such as support vector machine, random forest and deep learning) on the basis of only the dynamic information (normal dynamic information) obtained by performing dynamic radiographing on a subject who does not have a disease and attribute information of the subject who does not have a disease. Construction of a normal model through machine learning and utilization of the normal model are implemented through software processing by coordination of the CPU of the controller 11 and the medical information management program 151 stored in the storage 15.

As the patient parameters to be used in machine learning, a large volume of data sets of attribute information (such as age, sex, smoking history, body height, body weight, BMI and a pulmonary function test result) relating to normal cases (subject who does not have a disease) and dynamic information (such as a change rate of an area of a lung field, a restenosis rate of a diameter of an airway and speed of a diaphragm) is collected.

In the third embodiment, a normal model is created by utilizing past normal case data, and normality or abnormality of the diagnosis target dynamic information is determined by calculating a degree of deviation from the normal model, and thus, it is assumed that only normal case data is accumulated in the case database 152. In other words, all case data accumulated in the case database 152 is data which does not have a disease (normal), and thus, diagnosis results (normal/abnormal flag, diagnosis name) are not required in the case database 152.

In a case where attention is focused only on normal patients, it is considered that respective parameters included in the patient parameters are complicatedly related to each other, and the following characteristics can be extracted.

Parameters which are consistent and do not change

Parameters which are inconsistent and for which values change

Parameters which have (positive/negative) correlation with other parameters

Figure 13:
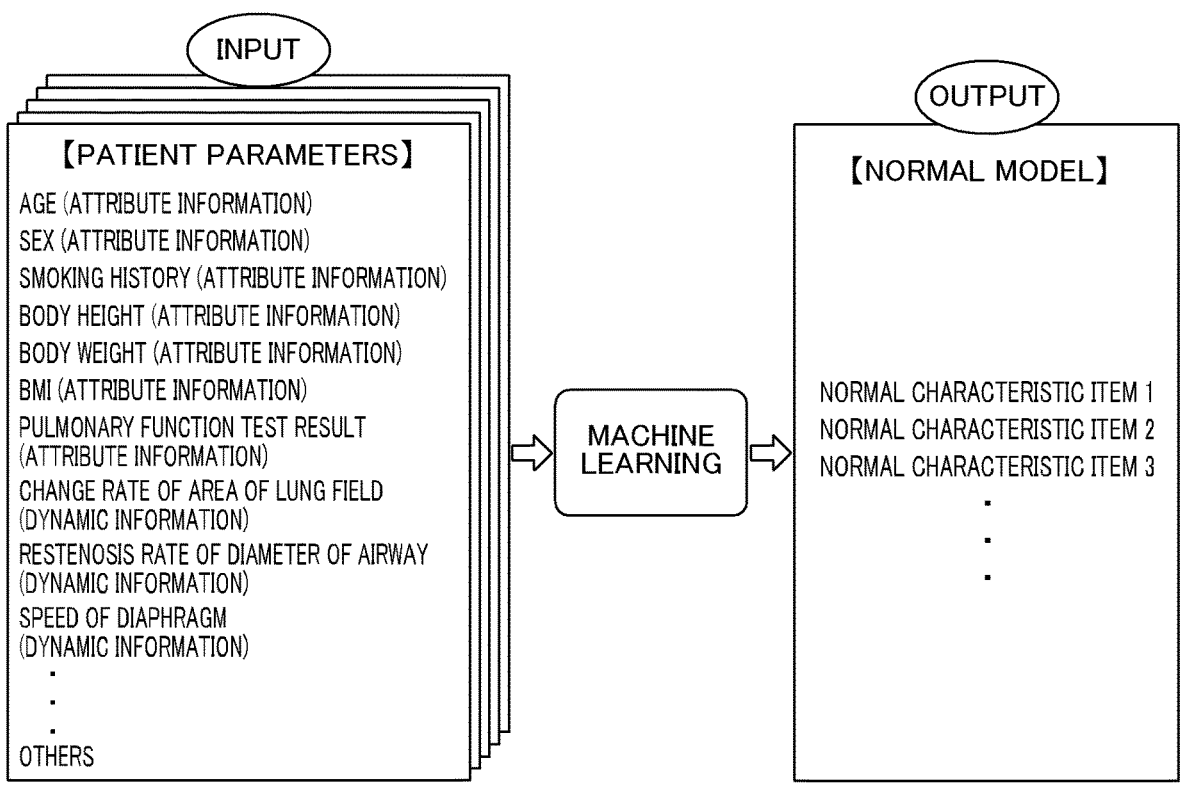
FIG. 13 is a view illustrating processing of creating a normal model through machine learning utilizing patient parameters of normal case data in a third embodiment of the present invention.

FIG. 13 illustrates processing of creating a normal model through machine learning utilizing the patient parameters (the normal attribute information, the normal dynamic information) of normal case data.

The controller 11 of the medical information management apparatus 10 creates a "normal model" by extracting characteristics of the patient parameters in normal cases by utilizing machine learning. The controller 11 automatically derives normal characteristic items of "normal model". For example, the controller 11 finds an item indicating relationship between body height and BMI as a normal characteristic item 1, an item indicating relationship between smoking history and a pulmonary function test result as a normal characteristic item 2, and an item indicating relationship between a restenosis rate of a diameter of an airway and a pulmonary function test result as a normal characteristic item 3.

The controller 11 determines normality and abnormality of the diagnosis target dynamic information by calculating a degree of deviation from "normal model" for the patient parameters (the attribute information and the dynamic information) relating to the diagnosis target patient.

For example, the controller 11 calculates a degree of deviation from "normal model" of the patient parameters relating to the diagnosis target patient for each of the normal characteristic items 1, 2, 3, . . . . Then, in a case where at least one of degrees of deviation corresponding to the respective normal characteristic items is greater than a predetermined threshold, the controller 11 may determine abnormality or may comprehensively determine the respective normal characteristic items to calculate a comprehensive degree of deviation again, and in a case where the comprehensive degree of deviation is greater than a predetermined threshold, the controller 11 may determine abnormality. A method for determining whether or not the dynamic information is normal or whether or not the dynamic information is abnormal is not particularly limited.

Further, the controller 11 causes a determination result indicating whether or not the dynamic information is normal, a degree of deviation from "normal model", or the like, for the patient parameters relating to the diagnosis target patient to be displayed at the display 13.

As described above, according to the third embodiment, by calculating a degree of deviation from the normal model created by utilizing the dynamic information (normal dynamic information) which is managed at the medical information management apparatus 10 and which is obtained by performing dynamic radiographing on a subject who does not have a disease, it is possible to determine normality or abnormality of the diagnosis target dynamic information.

Note that it is also possible to cause AI to collectively analyze and learn correlation among various normal characteristic items on the basis of the normal case data and directly calculate a degree of deviation (one value) from the normal model as output for the patient parameters of the diagnosis target.

Further, in the third embodiment, the attribute information does not have to be used as the patient parameters to generate the normal model through machine learning. In this case, the controller 11 creates a normal model by performing machine learning using only the dynamic information of normal case data as the patient parameters. The controller 11 determines normality or abnormality of the diagnosis target dynamic information on the basis of a degree of deviation from the normal model of the diagnosis target dynamic information.

Fourth Embodiment

A fourth embodiment to which the present invention is applied will be described next.

A medical information management system in the fourth embodiment has a configuration similar to the configuration of the medical information management system 100 described in the first embodiment, and thus, illustration and description of the configuration will be omitted. Characteristic configuration and processing of the fourth embodiment will be described below.

The medical information management apparatus 10 presents criteria for determining abnormality of second dynamic information (diagnosis target dynamic information) obtained by performing dynamic radiographing on a second subject (diagnosis target patient) by utilizing AI.

In the fourth embodiment, the controller 11 of the medical information management apparatus 10 learns an abnormality determination method including the criteria for determining whether or not the dynamic information is abnormal through machine learning (such as support vector machine, random forest and deep learning). The fourth embodiment is an example of a way of using the case database 152, which is a way that criteria for determining abnormality are proposed by clearly specifying criteria for determining abnormality (on which point attention should be focused) obtained through machine learning based on the case data to the user. Learning of the abnormality determination method, presentation of the criteria for determining abnormality and utilization of the abnormality determination method are implemented through software processing by coordination of the CPU of the controller 11 and the medical information management program 151 stored in the storage 15.

Data sets of attribute information (such as age, sex, smoking history, body height, body weight, BMI and a pulmonary function test result) and dynamic information (such as a change rate of an area of a lung field, a restenosis rate of a diameter of an airway and speed of a diaphragm) relating to respective cases are collected as the patient parameters to be used in machine learning and accumulated in the case database 152.

Figure 14:
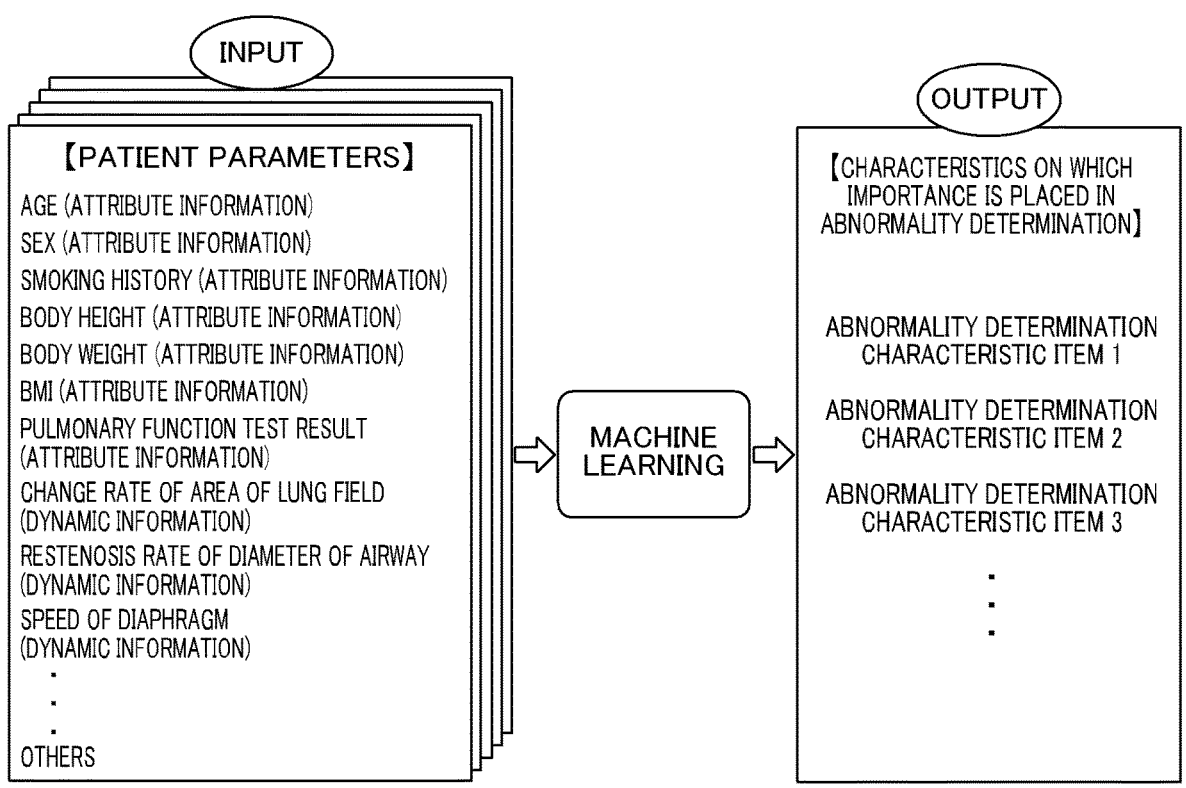
FIG. 14 is a view illustrating processing of extracting characteristics on which importance is placed in determination as to whether or not there is an abnormality, through machine learning utilizing patient parameters of case data in a fourth embodiment of the present invention.

FIG. 14 illustrates processing of extracting characteristics on which importance is placed in determination as to whether or not the dynamic information is abnormal, through machine learning utilizing the patient parameters of the case data.

The input data may be either only normal case data, only abnormal case data or mixture of normal case data and abnormal case data.

In a case where only normal case data is used as the input data, the controller 11 extracts characteristics (abnormality determination characteristic items) on which importance is placed in determination of abnormality, from characteristics of respective parameters in normal cases through machine learning utilizing the patient parameters of the normal case data.

In a case where only abnormal case data is used as the input data, the controller 11 extracts characteristics on which importance is placed in determination of abnormality, from characteristics of respective parameters in abnormal cases through machine learning utilizing the patient parameters of the abnormal case data.

In a case where normal case data and abnormal case data are used as the input data, the controller 11 also receives input of normal/abnormal labels (normal/abnormal flags) for the respective pieces of case data and extracts characteristics on which importance is placed in determination of abnormality from characteristics of respective parameters in normal cases and characteristics of respective parameters in abnormal cases through machine learning utilizing the patient parameters of the normal case data and the abnormal case data.

The controller 11 automatically derives abnormality determination characteristic items by utilizing machine learning. For example, the controller 11 finds an item indicating relationship between body height and BMI as an abnormality determination characteristic item 1, an item indicating relationship between smoking history and a pulmonary function test result as an abnormality determination characteristic item 2, and an item indicating a restenosis rate of a diameter of an airway alone as an abnormality determination characteristic item 3.

The controller 11 causes the abnormality determination characteristic items 1, 2, 3, . . . obtained through machine learning to be displayed at the display 13 to present criteria for determining abnormality to the user.

As described above, according to the fourth embodiment, by analyzing case data managed at the medical information management apparatus 10, it is possible to propose abnormality determination characteristic items which become criteria for determining abnormality to the user.

Note that in the fourth embodiment, the attribute information does not have to be used as the patient parameters in extraction of the criteria for determining abnormality and in machine learning of the abnormality determination method. In this case, the controller 11 performs machine learning using only the dynamic information of case data as the patient parameters to learn the abnormality determination method including the criteria.

Description in the above-described embodiments is an example of the medical information management apparatus, the data structure of medical information and the medical information management program according to the present invention, and the present invention is not limited to this. Detailed configurations and detailed operation of respective components can be also changed as appropriate within a scope not deviating from the gist of the present invention.

For example, characteristic configurations and processing of the respective embodiments may be combined.

Further, the data structure of the case database 152 is not limited to the illustrated example and can be changed depending on the intended use. The case database 152 may be managed for each patient or may be managed for each disease (including a case of no disease).

Further, except the third embodiment, while both normal cases and abnormal cases are accumulated in the case database 152 and normality is distinguished from abnormality with the normal/abnormal flag, case data may be separately accumulated in a normal case database and in an abnormal case database. In this case, the normal dynamic information and the normal attribute information are managed in association with each other in the normal case database, and the abnormal dynamic information and the abnormal attribute information are managed in association with each other in the abnormal case database. Further, diagnosis name may be associated with each piece of case data in the abnormal case database.

Further, the case database 152 may include only the normal/abnormal flag as a diagnosis result for each piece of case data without including diagnosis name. In this case, it is possible to utilize whether or not the subject has a disease (normal or abnormal) for each piece of case data.

Further, each piece of case data in the case database 152 does not have to include information (normal/abnormal flag) which directly indicates normality/abnormality, and whether or not the subject has a disease (normal or abnormal) may be able to be determined from other information such as diagnosis name. Specifically, the case database 152 includes only diagnosis name as a diagnosis result for each piece of case data without including the normal/abnormal flag. In this case, it is possible to determine that the subject does not have a disease by making the diagnosis name blank or setting "no disease" for normal cases.

Further, a program for executing each kind of processing at each apparatus may be stored in a portable recording medium. Still further, a carrier wave may be applied as a medium which provides data of a program via a communication line.

Although embodiments of the present invention have been described and illustrated in detail, the disclosed embodiments are made for purposes of illustration and example only and not limitation. The scope of the present invention should be interpreted by terms of the appended claims.

What is claimed is:

1. A medical information management apparatus comprising a hardware processor and a case database storing a plurality of case data, each of the case data including a dynamic image associated with attribute information of a subject of the dynamic image, the case data including a first dynamic image obtained by performing dynamic radiographing on a first subject that does not have a disease and first attribute information of the first subject, the first dynamic image and the first attribute information being managed in association with each other, and a third dynamic image obtained by performing dynamic radiographing on a third subject that has a disease and third attribute information of the third subject, the third dynamic image and the third attribute information being managed in association with each other, wherein the hardware processor receives search conditions input by a user that defines at least one attribute condition of a second subject and a designation of a diagnosis target information, the hardware processor extracts matching data from the case data that matches the at least one attribute condition, the hardware processor determines a degree of normality and a degree of abnormality of a second dynamic image obtained by performing dynamic radiographing on the second subject based on the values of the diagnosis target information of the matching data, the hardware processor creates a graph for the diagnosis target information that illustrates values of the diagnosis target information for each of the matching data and adds a position of a value of the diagnosis target information of the second dynamic image obtained by performing dynamic radiographing of the second subject, whereby the position corresponding to the second dynamic image can be compared with the matching data by the user.

2. The medical information management apparatus according to claim 1, wherein the first subject does not have the disease of a specific part.

3. The medical information management apparatus according to claim 2, wherein the specific part is at least one of parts relating to respiration, circulation, orthopedics, and swallowing.

4. The medical information management apparatus according to claim 1, wherein the first attribute information does not include information that specifies an individual and the hardware processor does not associate the information that specifies an individual with the first dynamic image.

5. The medical information management apparatus according to claim 1, wherein the third attribute information does not include information that specifies an individual and the hardware processor does not associate the information that specifies an individual with the first dynamic image.

6. The medical information management apparatus according to claim 1, wherein the hardware processor determines the degree of normality and the degree of abnormality of the second dynamic image obtained by performing dynamic radiographing on a second subject based on the dynamic image of the case data of the matching data.

7. The medical information management apparatus according to claim 6, wherein the hardware processor determines the degree of normality and the degree of abnormality of the second dynamic image based on the dynamic image and the attribute information of the case data of the matching data.

8. The medical information management apparatus according to claim 1, wherein the hardware processor determines the degree of normality and the degree of abnormality of the second dynamic image is normal or abnormal, based on machine learning.

9. A non-transitory computer-readable storage medium storing a data structure of medical information including a plurality of case data, each of the case data including dynamic image data associated with attribute information of a subject of the dynamic image data, the data structure comprising:
- first dynamic image data obtained by performing dynamic radiographing on a first subject that does not have a disease and first attribute information data of the first subject associated with the first dynamic image data, and third dynamic image data obtained by performing dynamic radiographing on a third subject that has a disease and third attribute information of the third subject associated with the third dynamic image data,
- the non-transitory computer-readable storage medium storing a medical information management program causing a computer to receive search conditions input by a user that defines at least one attribute condition of a second subject and a designation of a diagnosis target information,
- extract matching data from the case data that matches the at least one attribute condition,
- determine a degree of normality and a degree of abnormality of a second dynamic image obtained by performing dynamic radiographing on a second subject based on the values of the diagnosis target information of the matching data,
- create a graph for the diagnosis target information that illustrates values of the diagnosis target information for each of the matching data and adds a position of a value of the diagnosis target information of the second dynamic image obtained by performing dynamic radiographing of the second subject, whereby the position corresponding to the second dynamic image can be compared with the matching data by the user.

10. A non-transitory computer-readable storage medium storing a medical information management program causing a computer to:
- perform a management process of managing a case database storing a plurality of case data, each of the case data including a dynamic image associated with attribute information of a subject of the dynamic image, the case data including a first dynamic image obtained by performing dynamic radiographing on a first subject that does not have a disease and first attribute information of the first subject, the first dynamic image and the first attribution information being managed in association with each other, and a third dynamic image obtained by performing dynamic radiographing on a third subject that has a disease and third attribute information of the third subject, the third dynamic image and the third attribute information being managed in association with each other,
- receive search conditions input by a user that defines at least one attribute condition of a second subject and a designation of a diagnosis target information,
- extract matching data from the case data that matches the at least one attribute condition,
- determine a degree of normality and a degree of abnormality of a second dynamic image obtained by performing dynamic radiographing on a second subject based on the values of the diagnosis target information of the matching data, and
- create a graph for the diagnosis target information that illustrates values of the diagnosis target information for each of the matching data and adds a position of a value of the diagnosis target information of the second dynamic image obtained by performing dynamic radiographing of the second subject, whereby the position corresponding to the second dynamic image can be compared with the matching data by the user.

11. The non-transitory computer-readable storage medium according to claim 10, wherein the first subject does not have the disease of a specific part.

12. The non-transitory computer-readable storage medium according to claim 11, wherein the specific part is at least one of parts related to respiration, circulation, orthopedics, and swallowing.

13. The non-transitory computer-readable storage medium according to claim 10, wherein the first attribute information does not include information that specifies an individual and the management process does not associate the information that specifies an individual with the first dynamic image.

14. The non-transitory computer-readable storage medium according to claim 10, wherein the third attribute information does not include information that specifies an individual and the management process does not associate the information that specifies an individual with the first dynamic image.

15. The non-transitory computer-readable storage medium according to claim 10, wherein the program causes the computer to perform a determination process of determining the degree of normality and the degree of abnormality of the second dynamic image based on the dynamic image of the case data of the matching data.

16. The non-transitory computer-readable storage medium according to claim 15, wherein, in the determination process, the computer determines the degree of normality and the degree of abnormality of the second dynamic image based on the dynamic image and the attribute information of the case data of the matching data.

17. The non-transitory computer-readable storage medium according to claim 10, wherein, in the determination process, the computer determines the degree of normality and the degree of abnormality of the second dynamic image based on machine learning.

18. The medical information management apparatus according to claim 1, wherein the hardware processor outputs the matching data extracted by the search to the display.

19. The medical information management apparatus according to claim 18, wherein the obtained input information further includes information regarding normality or abnormality.

20. The non-transitory computer-readable storage medium according to claim 10, wherein the medical information management program causes the computer to output the matching data extracted by the search to the display.

21. The non-transitory computer-readable storage medium according to claim 20, wherein the obtained input information further includes information regarding normality or abnormality.

22. The medical information management apparatus according to claim 1, wherein the degree of normality and the degree of abnormality are probabilities.

23. The medical information management apparatus according to claim 1, wherein
- the degree of normality is based on a ratio of the number of normal case data of the matching data to the total number of case data of the matching data, and
- the degree of abnormality is based on a ratio of the number of abnormal case data of the matching data to the total number of case data of the matching data.

24. The medical information management apparatus according to claim 1, wherein the graph is a histogram of the diagnosis target information of the matching data and the position of the diagnosis target information of the second dynamic image is shown on the histogram.

25. The medical information management apparatus according to claim 1, wherein the attribute information of the each of the case data does not include information that specifies an individual and the hardware processor does not associate the information that specifies an individual with the dynamic image of the each of the case data.

* * * * *